(12) United States Patent
Hatanaka

(10) Patent No.: US 9,174,546 B2
(45) Date of Patent: Nov. 3, 2015

(54) PROPULSION CONTROL APPARATUS OF ELECTRIC MOTOR VEHICLE AND CONTROL METHOD FOR PROPULSION CONTROL APPARATUS

(75) Inventor: Keita Hatanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/369,208

(22) PCT Filed: Jan. 30, 2012

(86) PCT No.: PCT/JP2012/052039
§ 371 (c)(1),
(2), (4) Date: Jun. 27, 2014

(87) PCT Pub. No.: WO2013/114546
PCT Pub. Date: Aug. 8, 2013

(65) Prior Publication Data
US 2015/0008674 A1   Jan. 8, 2015

(51) Int. Cl.
*H02P 3/14* (2006.01)
*B60L 11/18* (2006.01)
(Continued)

(52) U.S. Cl.
CPC ............ *B60L 11/1809* (2013.01); *B60L 3/003* (2013.01); *B60L 3/0061* (2013.01); *B60L 7/14* (2013.01);
(Continued)

(58) Field of Classification Search
USPC ......... 318/107, 108, 109, 124, 722, 800, 801, 318/375, 376; 180/65.1, 65.21, 65.22, 180/65.225, 65.265, 65.29, 65.31, 65.8, 180/65.275; 307/6, 8, 43, 57, 58, 67, 82, 307/151
See application file for complete search history.

(56) References Cited

U.S. PATENT DOCUMENTS 8,427,004 B2 *  4/2013  Kitanaka ................. 307/10.7
8,857,542 B2 * 10/2014  Hendrickson et al. ....... 180/65.1

FOREIGN PATENT DOCUMENTS

JP    10-066204 A    3/1998
JP    2003-134604 A  5/2003
(Continued)

OTHER PUBLICATIONS

International Search Report (PCT/ISA/210) mailed on Mar. 6, 2012, by the Japanese Patent Office as the International Searching Authority for International Application No. PCT/JP2012/052039.
(Continued)

*Primary Examiner* — Antony M Paul
(74) *Attorney, Agent, or Firm* — Buchanan Ingersoll & Rooney PC

(57) ABSTRACT

A power storage device is electrically connected to a first input and output end located on the opposite side of a direct-current common section in a second power converter. According to an input form of electric power, a first power converter operates as a DC/AC converter or an AC/DC converter. The second power converter operates as a DC/AC converter, an AC/DC converter, or a DC/DC converter. The power storage device is charged using direct-current power supplied from the direct-current common section or the first input and output end side. The power storage device discharges desired direct-current power to the direct-current common section or the first input and output end side. A control device freely adjusts, according to the input form of the electric power, the voltage of the direct-current common section to a desired voltage including a high voltage or a low voltage.

18 Claims, 40 Drawing Sheets

(51) Int. Cl.
*B60L 9/18* (2006.01)
*B60L 3/00* (2006.01)
*B60L 7/14* (2006.01)
*B60L 7/20* (2006.01)
*B60L 9/24* (2006.01)
*B60L 11/00* (2006.01)
*B60L 11/16* (2006.01)
*B60L 15/20* (2006.01)
*B60L 11/12* (2006.01)
*B60L 9/04* (2006.01)
*B60L 11/06* (2006.01)

(52) U.S. Cl.
CPC ... *B60L 7/20* (2013.01); *B60L 9/04* (2013.01); *B60L 9/18* (2013.01); *B60L 9/24* (2013.01); *B60L 11/005* (2013.01); *B60L 11/06* (2013.01); *B60L 11/123* (2013.01); *B60L 11/16* (2013.01); *B60L 15/2009* (2013.01); *B60L 2200/26* (2013.01); *B60L 2210/10* (2013.01); *B60L 2210/30* (2013.01); *B60L 2210/40* (2013.01); *B60L 2220/14* (2013.01); *B60L 2240/421* (2013.01); *Y02T 10/6217* (2013.01); *Y02T 10/642* (2013.01); *Y02T 10/7022* (2013.01); *Y02T 10/7077* (2013.01); *Y02T 10/7216* (2013.01); *Y02T 10/7241* (2013.01); *Y02T 10/7275* (2013.01)

(56) References Cited

FOREIGN PATENT DOCUMENTS

| | | |
|---|---|---|
| JP | 2004-304989 A | 10/2004 |
| JP | 2008-067510 A | 3/2008 |
| JP | 2010-088145 A | 4/2010 |

OTHER PUBLICATIONS

Written Opinion (PCT/ISA/237) mailed on Mar. 6, 2012, by the Japanese Patent Office as the International Searching Authority for International Application No. PCT/JP2012/052039.

* cited by examiner

FIG.13

| SIGN | | 2 | 11 | 21 | 25 | 26 | 51 | 55 | 56 | 64 | 70 | 63 | 61 | 6 | 5 | FIG. | MODE |
|---|---|---|---|---|---|---|---|---|---|---|---|---|---|---|---|---|---|
| COMPONENT<br>OPERATION FORM | | PANTO-GRAPH | FIRST CIRCUIT BREAKER | FIRST POWER CONVERTER | FIRST LINE BREAKER | SECOND LINE BREAKER | SECOND POWER CONVERTER | THIRD LINE BREAKER | FOURTH LINE BREAKER | SECOND CIRCUIT BREAKER | SECOND CONTACTOR | FIRST CONTACTOR | THIRD CONTACTOR | GENERATOR | ENG | | |
| a-1 | BAT⇒INV⇒ENG START | OFF | × | × | × | × | × | ○ | ○ | ○ | × | ○ | ○ | ○ | ○ | 3 | START |
| a-2 | GENERATOR⇒CNV⇒INV⇒MOTOR DRIVING, BAT NOT IN USE | OFF | × | INV | ○ | ○ | CNV | ○ | ○ | × | × | × | ○ | ○ | ○ | 4 | POWER RUNNING |
| a-3 | GENERATOR⇒CNV⇒INV⇒MOTOR DRIVING, BAT IN USE | OFF | × | INV | ○ | ○ | CNV | ○ | ○ | ○ | × | ○ | ○ | ○ | ○ | 5 | POWER RUNNING+ DISCHARGING |
| a-4 | BAT⇒DC/DC⇒INV⇒MOTOR DRIVING | OFF | × | INV | ○ | ○ | DC/DC | ○ | ○ | ○ | ○ | × | × | × | × | 6 | POWER RUNNING |
| a-5 | BAT⇒INV⇒MOTOR DRIVING | OFF | × | INV | ○ | ○ | × | × | × | ○ | × | ○ | × | × | × | 7 | POWER RUNNING |
| a-6 | MOTOR⇒CNV⇒INV⇒GENERATOR, BAT NOT IN USE | OFF | × | CNV | ○ | ○ | INV | ○ | ○ | × | × | × | ○ | ○ | ○ | 8 | REGENERATION |
| a-7 | MOTOR⇒CNV⇒INV⇒GENERATOR, BAT IN USE | OFF | × | CNV | ○ | ○ | INV | ○ | ○ | ○ | × | ○ | ○ | ○ | ○ | 9 | REGENERATION+ CHARGING+ ENGINE BRAKE |
| a-8 | MOTOR⇒CNV⇒DC/DC⇒BAT | OFF | × | CNV | ○ | ○ | DC/DC | ○ | ○ | ○ | ○ | × | × | × | × | 10 | REGENERATION+ CHARGING |
| a-9 | MOTOR⇒CNV⇒BAT | OFF | × | CNV | ○ | ○ | × | × | × | ○ | × | ○ | × | × | × | 11 | REGENERATION+ CHARGING |
| a-10 | GENERATOR⇒CNV⇒BAT CHARGING | OFF | × | × | × | × | CNV | ○ | ○ | ○ | × | ○ | ○ | ○ | ○ | 12 | POWER GENERATION AND CHARGING |

| | | | |
|---|---|---|---|
| | | | GENERATOR |
| | | BAT | LOW VOLTAGE |
| | BAT | HIGH VOLTAGE | |
| BAT | OVERHEAD WIRE | | |

FIG.24

| SIGN | | 2 | 11 | 21 | 25 | 26 | 51 | 55 | 56 | 64 | 70 | 63 | 61 | 6 | 5 | FIG. | MODE |
|---|---|---|---|---|---|---|---|---|---|---|---|---|---|---|---|---|---|
| | COMPONENT | PANTO-GRAPH | FIRST CIRCUIT BREAKER | FIRST POWER CONVERTER | FIRST LINE BREAKER | SECOND LINE BREAKER | SECOND POWER CONVERTER | THIRD LINE BREAKER | FOURTH LINE BREAKER | SECOND CIRCUIT BREAKER | SECOND CONTACTOR | FIRST CONTACTOR | THIRD CONTACTOR | GENERATOR | ENG | | |
| | OPERATION FORM | | | | | | | | | | | | | | | | |
| b-1 | DC OVERHEAD WIRE⇒INV⇒ENG START | ON | ○ | × | × | × | INV | ○ | ○ | × | × | × | ○ | ○ | ○ | 14 | START |
| b-2 | GENERATOR⇒CNV⇒DC OVERHEAD WIRE | ON | ○ | × | × | × | CNV | ○ | ○ | × | × | × | ○ | ○ | ○ | 15 | POWER GENERATION AND REGENERATION |
| b-3 | DC OVERHEAD WIRE⇒INV⇒MOTOR DRIVING | ON | ○ | INV | ○ | ○ | × | × | × | × | × | × | × | × | × | 16 | POWER RUNNING |
| b-4 | DC OVERHEAD WIRE⇒INV⇒MOTOR DRIVING, GENERATOR⇒CNV⇒INV⇒MOTOR DRIVING, BAT NOT IN USE | ON | ○ | INV | ○ | ○ | CNV | ○ | ○ | × | × | × | ○ | ○ | ○ | 17 | POWER RUNNING +POWER GENERATION |
| b-5 | DC OVERHEAD WIRE⇒INV⇒MOTOR DRIVING, BAT DISCHARGING⇒DC/DC⇒INV⇒MOTOR DRIVING | ON | ○ | INV | ○ | ○ | DC/DC | ○ | ○ | ○ | ○ | × | × | × | × | 18 | POWER RUNNING +DISCHARGING |
| b-6 | DC OVERHEAD WIRE⇒INV⇒MOTOR DRIVING, DC OVERHEAD WIRE⇒DC/DC⇒BAT CHARGING | ON | ○ | INV | ○ | ○ | DC/DC | ○ | ○ | ○ | ○ | × | × | × | × | 19 | POWER RUNNING +CHARGING |
| b-7 | MOTOR⇒CNV⇒DC OVERHEAD WIRE | ON | ○ | CNV | ○ | ○ | × | × | × | × | × | × | × | × | × | 20 | REGENERATION |
| b-8 | MOTOR⇒CNV⇒DC OVERHEAD WIRE, MOTOR⇒CNV⇒INV⇒GENERATOR, BAT NOT IN USE | ON | ○ | CNV | ○ | ○ | INV | ○ | ○ | × | × | × | ○ | ○ | ○ | 21 | REGENERATION +ENGINE BRAKE |
| b-9 | MOTOR⇒CNV⇒DC OVERHEAD WIRE, MOTOR⇒CNV⇒DC/DC⇒BAT CHARGING | ON | ○ | CNV | ○ | ○ | DC/DC | ○ | ○ | ○ | ○ | × | × | × | × | 22 | REGENERATION +CHARGING |
| b-10 | DC OVERHEAD WIRE⇒DC/DC⇒BAT CHARGING, BAT DISCHARGING⇒DC/DC⇒DC OVERHEAD WIRE | ON | ○ | × | × | × | DC/DC | ○ | ○ | ○ | ○ | × | × | × | × | 23 | CHARGING/DISCHARGING |

Notes: 11 = DC OVERHEAD WIRE; 64 = BAT; 70 = BAT (HIGH VOLTAGE); 63 = BAT (LOW VOLTAGE); 61 = GENERATOR

FIG.39

| | SIGN | | 2 | 11 | 21 | 25 | 26 | 51 | 55 | 56 | 64 | 70 | 63 | 81 | 82 | FIG. | MODE |
|---|---|---|---|---|---|---|---|---|---|---|---|---|---|---|---|---|---|
| | | COMPONENT | DC PANTO-GRAPH | FIRST CIRCUIT BREAK-ER | FIRST POWER CONVER-TER | FIRST LINE BREAK-ER | SEC-OND LINE BREAK-ER | SECOND POWER CONVER-TER | THIRD LINE BREAK-ER | FOURTH LINE BREAK-ER | SEC-OND CIRCUIT BREAK-ER | SECOND CONTAC-TOR | FIRST CONTAC-TOR | THIRD CIRCUIT BREAK-ER | AC PANTO-GRAPH | | |
| | OPERATION FORM | | | | | | | | | | | | | | | | |
| c-1 | DC OVERHEAD WIRE⇒INV⇒ MOTOR DRIVING | | ON | ○ | INV | ○ | ○ | × | × | × | × | × | × | × | OFF | 27 | POWER RUNNING |
| c-2 | AC OVERHEAD WIRE⇒CNV⇒ INV⇒MOTOR DRIVING, BAT NOT IN USE | | OFF | × | INV | ○ | ○ | CNV | ○ | ○ | ○ | × | × | ○ | ON | 28 | POWER RUNNING |
| c-3 | AC OVERHEAD WIRE⇒CNV⇒ INV⇒MOTOR DRIVING, BAT IN USE | | OFF | × | INV | ○ | ○ | CNV | ○ | ○ | ○ | × | ○ | ○ | ON | 29 | POWER RUNNING |
| c-4 | AC OVERHEAD WIRE⇒CNV⇒ MOTOR DRIVING BAT DISCHARGING⇒DC/DC ⇒INV⇒MOTOR DRIVING | | ON | ○ | INV | ○ | ○ | DC/DC | ○ | ○ | ○ | ○ | × | × | OFF | 30 | POWER RUNNING |
| c-5 | MOTOR⇒CNV⇒ DC OVERHEAD WIRE | | ON | ○ | CNV | ○ | ○ | × | ○ | ○ | × | × | × | × | OFF | 31 | REGENERA-TION |
| c-6 | MOTOR⇒CNV⇒INV⇒ AC OVERHEAD WIRE, BAT NOT IN USE | | OFF | × | CNV | ○ | ○ | INV | ○ | ○ | ○ | × | × | ○ | ON | 32 | REGENERA-TION |
| c-7 | MOTOR⇒CNV⇒INV⇒ AC OVERHEAD WIRE | | OFF | × | CNV | ○ | ○ | INV | ○ | ○ | ○ | × | ○ | ○ | ON | 33 | REGENERA-TION+CHARGING |
| c-8 | MOTOR⇒CNV⇒ BAT CHARGING | | ON | ○ | CNV | ○ | ○ | DC/DC | ○ | ○ | ○ | ○ | × | × | OFF | 34 | REGENERA-TION+CHARGING |
| c-9 | DC OVERHEAD WIRE⇒DC/DC ⇒BAT CHARGING BAT DISCHARGING⇒DC/DC ⇒ DC OVERHEAD WIRE | | ON | ○ | × | × | × | DC/DC | ○ | ○ | ○ | ○ | × | × | OFF | 35 | CHARGING/DISCHARG-ING |
| c-10 | AC OVERHEAD WIRE⇒CNV⇒BAT CHARGING BAT DISCHARGING⇒INV⇒ AC OVERHEAD WIRE | | OFF | × | × | × | × | CNV INV | ○ | ○ | × | ○ | ○ | ○ | ON | 36 | CHARGING/DISCHARG-ING |
| c-11 | AC OVERHEAD WIRE⇒CNV⇒ DC OVERHEAD WIRE | | ON | ○ | × | × | × | CNV INV | ○ | ○ | ○ | × | × | ○ | ON | 37 | POWER INTER-CHANGE |
| c-12 | DC OVERHEAD WIRE⇒INV⇒ MOTOR DRIVING DC OVERHEAD WIRE⇒DC/DC ⇒BAT CHARGING | | ON | ○ | INV | ○ | ○ | DC/DC | ○ | ○ | ○ | ○ | × | × | OFF | 38 | POWER RUNNING +CHARGING |
| | | | DC OVER-HEAD WIRE | DC OVER-HEAD WIRE | | | | | | | BAT | BAT | BAT | AC OVER-HEAD WIRE | AC OVER-HEAD WIRE | | |
| | | | | | | | | | | | HIGH VOLTAGE | LOW VOLTAGE | | | | |

PROPULSION CONTROL APPARATUS OF ELECTRIC MOTOR VEHICLE AND CONTROL METHOD FOR PROPULSION CONTROL APPARATUS

FIELD

The present invention relates to a propulsion control apparatus for an electric motor vehicle including a power storage device and a control method for the propulsion control apparatus.

BACKGROUND

Conventionally, for example, Patent Literature 1 discloses, as a railroad vehicle, a configuration including a generator linked to an engine through a power transmission device, a rectifier that converts an output of the generator into a direct current, an inverter connected to the rectifier, a motor linked to the inverter, an energy storage device branching from and linked to a wire between the rectifier and the inverter, an energy control device connected among the rectifier, the inverter, and the energy storage device.

Patent Literature 2 discloses, as a driving system of a railroad vehicle, a configuration including an engine, a generator that converts an axial rotating force generated by the engine into alternating-current power, an AC/DC converter that converts the alternating-current power generated by the generator into direct-current power and supplies the direct-current power to power transmitting means, an inverter device that converts the direct-current power supplied by the power transmitting means into three-phase alternating-current power and drives an electric motor, and a system integrated control device that controls the engine, the generator, the AC/DC converter, the inverter device, and the electric motor.

Patent Literature 2 also discloses a configuration including power storage means instead of the engine and the generator, which are power generating means. In this case, the configuration includes a DC/DC converter instead of the AD/DC converter.

CITATION LIST

Patent Literature

Patent Literature 1: Japanese Patent Application Laid-Open No. 2003-134604
Patent Literature 2: Japanese Patent Application Laid-Open No. 2010-088145

SUMMARY

Technical Problem

In the configuration disclosed in Patent Literature 1, although the railroad vehicle includes the energy storage device functioning as a power storage device, the railroad vehicle is a hybrid vehicle that does not use overhead wire power. The energy storage device is directly connected to an input stage of the inverter, which is a DC/AC converter. Therefore, it is difficult to use the railroad vehicle as a railroad vehicle that uses the overhead wire power.

In this regard, in Patent Literature 2, when the engine and the generator are used as power generating means, the AD/DC converter adjusts a voltage difference between the power generating means and an overhead wire voltage. When the power storage device is used as the power generating means, the DC/DC converter adjusts a voltage difference between the power storage device and the overhead wire voltage.

However, in the idea of Patent Literature 2, when the conventional hybrid vehicle adopts a system configuration that uses three kinds of electric power by the overhead wire power, the engine and the generator, and the power storage device, three power converters are necessary, wherein an inverter, which is a DC/AC converter for driving the electric motor, a converter, which is an AC/DC converter for adjusting an alternating-current voltage generated by the engine and the generator to an overhead wire voltage, and a DC/DC converter for adjusting an alternating-current voltage generated by the engine and the generator to the overhead wire voltage are included. Therefore, there is a problem in that an increase in costs, an increase in the size of the apparatus, and an increase in mass are caused.

The present invention has been devised in view of the above and it is an object of the present invention to provide a propulsion control apparatus of an electric motor vehicle and a control method for the propulsion control apparatus that do not cause an increase of power converters even when the conventional hybrid vehicle is enabled to be used even with the overhead wire power.

Solution to Problem

In order to solve the aforementioned problems, a propulsion control apparatus of an electric motor vehicle according to one aspect of the present invention is configured to include: a first power converter that is connectable to a direct-current common section, operates as a DC/AC converter when direct-current power is input from the direct-current common section, converts the direct-current power into desired alternating-current power and supplies the desired alternating-current power to a motor that generates a driving force for a vehicle, operates as an AC/DC converter according to necessity when regenerative power of the motor is input from the motor side, and supplies the regenerative power to the direct-current common section; a second power converter that operates as an AC/DC converter when alternating-current power supplied from an alternating-current power supply source is input from a first input and output end side, converts the alternating-current power into direct-current power and outputs the direct-current power to the direct-current common section via a second input and output end different from the first input and output end, operates as a DC/AC converter and output desired direct-current power to the first input and output end side when direct-current power supplied from the direct-current common section is input from the second input and output end side, operates as a DC/DC converter and outputs desired direct-current power to the second input and output end side when direct-current power is input from the first input and output end side, and operates as the DC/DC converter and outputs desired direct-current power to the first input and output end side when direct-current power is input from the second input and output end side; a power storage device functioning as a direct-current power supply source that is configured to be connectable to the direct-current common section and the first input and output end side and charged with direct-current power supplied from the direct-current common section or the first input and output end side or discharges direct-current power to the direct-current common section or the first input and output end side; and a control device that controls operations of the first power converter, the second power converter, and the power storage device.

Advantageous Effects of Invention

According to the present invention, there is an effect that it is possible to provide a propulsion control apparatus of an electric motor vehicle and a control method for the propulsion control apparatus that do not cause an increase of power converters even when the conventional hybrid vehicle (a hybrid of an engine driving generator and a power storage device) is enabled to be used even with the overhead wire power.

BRIEF DESCRIPTION OF DRAWINGS

FIG. 13 is a diagram of a list in a table format of the operations shown in FIG. 3 to FIG. 12.

FIG. 24 is a diagram of a list in a table format of the operations shown in FIG. 14 to FIG. 23.

FIG. 39 is a diagram of a list in a table format of the operations shown in FIG. 27 to FIG. 38.

DESCRIPTION OF EMBODIMENTS

Propulsion control apparatuses of electric motors vehicle (hereinafter simply referred to as "propulsion control apparatus") and control methods for the propulsion control apparatuses according to embodiments of the present invention are explained below with reference to the accompanying drawings. Note that the present invention is not limited by the embodiments explained below.

First Embodiment

Figure 1:
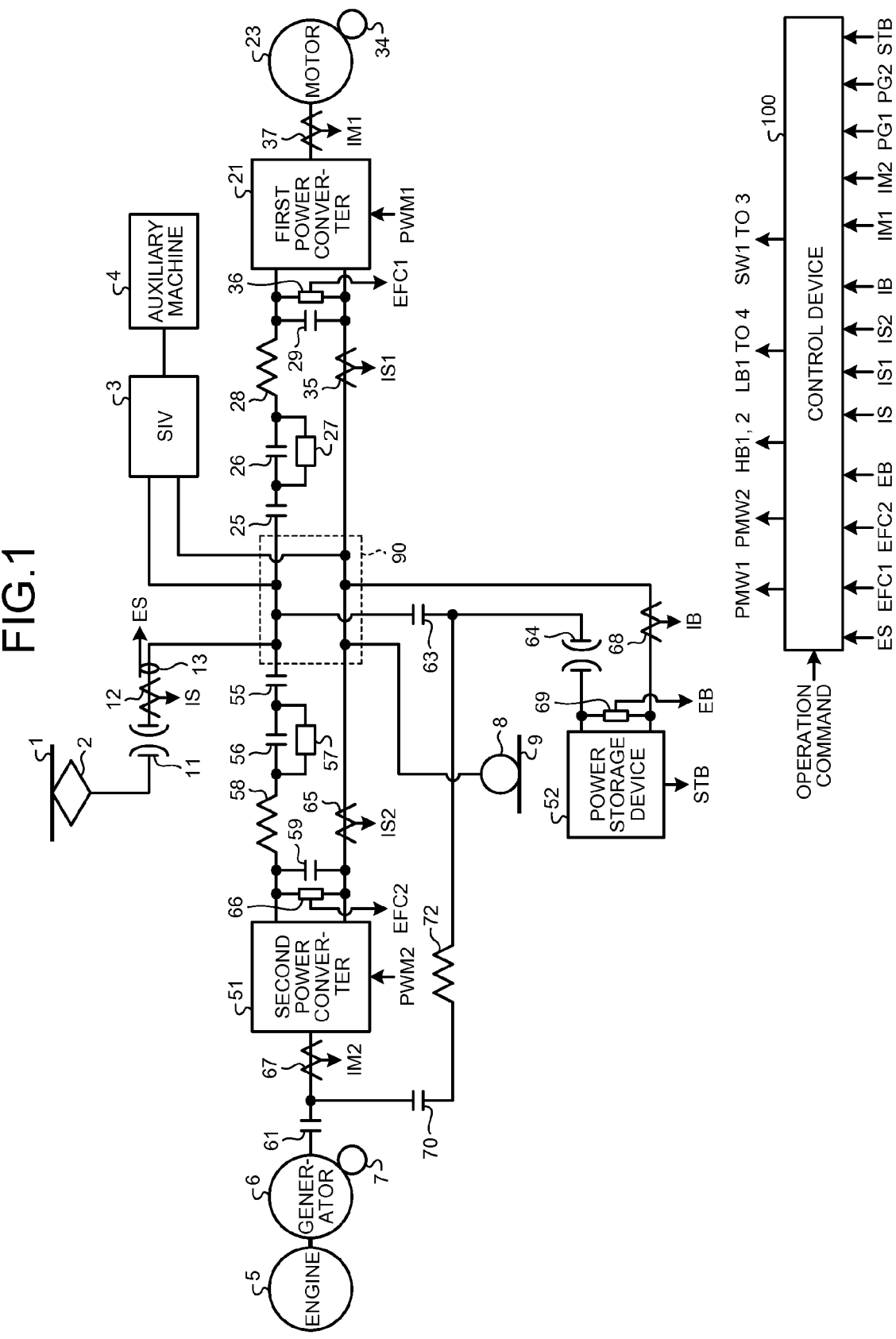
FIG. 1 is a diagram of a configuration example of a hybrid vehicle system including a propulsion control apparatus according to a first embodiment.

FIG. 1 is a diagram of a configuration example of a hybrid vehicle system including a propulsion control apparatus according to a first embodiment of the present invention.

The hybrid vehicle system according to the first embodiment is configured to receive direct-current power from a direct-current overhead wire (hereinafter referred to as "DC overhead wire") via a DC pantograph 2 and supply (apply) the received direct-current power to a direct-current common section 90 via a first circuit breaker 11. Note that a negative side of the direct-current common section 90 is in contact with a rail 9 via a wheel 8.

The hybrid vehicle system includes, as shown in FIG. 1, as main components, a motor 23, a first power converter 21, a first filter capacitor 29, a first filter reactor 28, an auxiliary power supply device (Static InVerter, hereinafter referred to as "SIV") 3, an auxiliary machine 4, a power storage device 52, a reactor 72, an engine 5, a generator 6, a second power converter 51, a second filter capacitor 59, a second filter reactor 58, and a control device 100 that controls the operation of the entire hybrid vehicle system. Further, the hybrid vehicle system includes a first line breaker 25 and a second line breaker 26 interposed among the main components to freely change a supply path of electric power, a first charging resistor 27 connected to the second line breaker 26 in parallel, a second circuit breaker 64, a first contactor 63, a second contactor 70, a third contactor 61, a third line breaker 55, a fourth line breaker 56, and a second charging resistor 57 connected to the fourth line breaker 56 in parallel. Note that the hybrid vehicle system includes, in addition to the components, a current detector and a voltage detector that detect electric currents and voltages in important positions and a rotation detector that detects speeds of the generator 6 and of the motor 23.

A connection relation among the sections included in the hybrid vehicle system and schematic functions of the sections are explained.

The engine 5 is connected to the generator 6, which is one of power supply sources that generate electric power. The generator 6 is an alternating-current generator driven by the engine 5. That is, the engine 5 and the generator 6 function as an alternating-current power supply source. The generator 6 is connected to the second power converter 51 via the third contactor 61. The generator 6 is driven by the second power converter 51 to operate as an alternating-current electric motor as well. The power storage device 52 is a storage device for electric energy including a lithium ion battery, a nickel hydrogen battery, an electric double layer capacitor, a lithium ion capacitor, a flywheel, or the like as storing means. The power storage device 52 is connected as another power supply source, which generates electric power, to the direct-current common section 90 via the first contactor 63 and the second circuit breaker 64 and to the second power converter 51 via the second contactor 70 and charges and discharges direct-current power.

The second power converter 51 operates as an AC/DC converter, a DC/AC converter, or a DC/DC converter. When the second power converter 51 operates as the AC/DC converter, the second power converter 51 converts alternating-current power generated by the generator 6 into direct-current power and supplies the direct-current power to the direct-current common section 90. When the second power converter 51 operates as the DC/AC converter, the second power converter 51 converts direct-current power supplied by the power storage device 52 or the DC overhead wire 1 via the direct-current common section 90 into alternating-current power and causes the generator 6 to operate as an alternating-current electric motor and drives the engine 5. When the second power converter 51 operates as the DC/DC converter, the second power converter 51 converts direct-current power supplied by the DC overhead wire 1 or the first power converter 21 via the direct-current common section 90 into desired direct-current power and charges the power storage device 52.

The first power converter 21 operates as a DC/AC converter or an AC/DC converter. When the first power converter 21 operates as the DC/AC converter, the first power converter 21 converts direct-current power supplied via the direct-current common section 90 into alternating-current power and drives the motor 23. On the other hand, when the first power converter 21 operates as the AC/DC converter, the first power converter 21 converts regenerative power supplied from the motor 23 into direct-current power and supplies the direct-current power to the direct-current common section 90.

The motor 23 receives the supply of the alternating-current power from the first power converter 21 and generates a driving force (a propulsive force). The SIV 3 is connected to the direct-current common section 90. The SIV 3 converts the direct-current power supplied via the direct-current common section 90 into alternating-current power having a constant voltage and a constant frequency and supplies the alternating-current power to the auxiliary machine 4. Note that the auxiliary machine 4 is a general term of load apparatuses other than a driving apparatus.

The first line breaker 25 and the second line breaker 26 are connected in series and inserted between the direct-current common section 90 and the first power converter 21. The first filter reactor 28 is inserted between the second line breaker 26 and the first power converter 21. The third line breaker 55 and the fourth line breaker 56 are connected in series and inserted between the direct-current common section 90 and the second power converter 51. The second filter reactor 58 is inserted between the fourth line breaker 56 and the second power converter 51.

Similarly, the first contactor 63 is inserted between the power storage device 52 and the direct-current common section 90, the second contactor 70 is inserted between the power storage device 52 and the second power converter 51, and the third contactor 61 is inserted between the generator 6 and the second power converter 51. One end of the first contactor 63 and one end of the second contactor 70 are connected on the side of the power storage device 52, and the second circuit breaker 64 is inserted between the connected ends and the power storage device 52.

Next, sensors are explained. An overhead wire voltage detector 13 detects an overhead wire voltage ES. An overhead wire current detector 12 detects an overhead wire current IS. A first filter capacitor voltage detector 36 detects a voltage (a first filter capacitor voltage) EFC1 of the first filter capacitor 29. A first direct current detector 35 detects a direct current (a first direct current) IS1 flowing into and flowing out from the first power converter 21. A first power converter output current detector 37 detects an alternating current (a first alternating current) IM1 flowing into and flowing out from the first power converter 21.

Similarly, a second filter capacitor voltage detector 66 detects a voltage (a second filter capacitor voltage) EFC2 of the second filter capacitor 59. A second direct current detector 65 detects a direct current (a second direct current) IS2 flowing into and flowing out from the second power converter 51. A second power converter output current detector 67 detects an alternating current (a second alternating current) IM2 flowing into and flowing out from the second power converter 51.

A power storage device current detector 68 detects a direct-current (a power storage device current) IB flowing into and flowing out from the power storage device 52. A first speed detector 34 detects rotating speed (motor rotating speed) PG1 of the motor 23. A second speed detector 7 detects rotating speed (generator rotating speed) PG2 of the generator 6.

Detection values detected by the sensors are input to the control device 100 as shown in the figure. In addition to the sensor information, state information STB representing the state of the power storage device 52 is input to the control device 100. The state information includes information representing a charging (storage) state (SOC: State Of Charge) of the power storage device 52 and information indicating whether the power storage device 52 is in a charging state or a discharging state (operation information).

Further, an operation command from a not-shown motorman's cab is also input to the control device 100. The control device 100 switches the operation mode of a vehicle according to the operation command. The control device 100 generates, on the basis of the detection values output from the various sensors, signals (PWM1 and PWM2) for controlling not-shown switching elements of the power converters, signals (HB1 and HB2) for controlling ON/OFF of the circuit breakers, signals (LB1 to LB4) for controlling ON/OFF of the line breakers, and signals (SW1 to SW3) for controlling ON/OFF of the contactors and outputs the signals to the control target sections. Note that, in FIG. 1, to avoid complication, control signals for the circuit breakers, the line breakers, and the contactors are not shown.

Operations corresponding to the operation commands in the propulsion control apparatus in the first embodiment are explained. Note that, when required electric power is supplied to the direct-current common section 90, the SIV 3 is turned on and required electric power is supplied to the auxiliary machine 4 (a light, an air conditioner, a control power supply, and the like). Note that explanation concerning the subsequent operations of the SIV 3 and the auxiliary machine 4 is omitted.

When an operation command "power running by overhead wire power" is input, the control device 100 controls the first line breaker 25 to be turned on and charges the first filter capacitor 29 via the first filter reactor 28 while limiting an electric current with the first charging resistor 27. When the control device 100 confirms with a voltage value detected by the first filter capacitor voltage detector 36 that the first filter capacitor 29 is charged up to a predetermined voltage, the control device 100 turns on the second line breaker 26 and short-circuits the first charging resistor 27. The first power converter 21 converts direct-current power into alternating-current power and drives the motor 23 to cause the vehicle to travel.

After the power running, when an operation command "brake" is input, the control device 100 causes the motor 23 to operate as a generator, converts generated alternating-current power into direct-current power with the first power converter 21, and returns the direct-current power to the DC overhead wire 1. When an overhead wire voltage is higher than a predetermined voltage, the control device 100 stops the vehicle with a not-shown air brake.

When an operation command "charge" is input, the control device 100 turns on the third line breaker 55 and charges the second filter capacitor 59 via the second filter reactor 58 while limiting an electric current with the second charging resistor 57. When the control device 100 confirms with a voltage value detected by the second filter capacitor voltage detector 66 that the second filter capacitor 59 is charged up to a predetermined voltage, the control device 100 turns on the fourth line breaker 56 and short-circuits the second charging resistor 57. Further, the control device 100 turns on the second contactor 70 and turns on the second circuit breaker 64. The second power converter 51 converts an overhead wire voltage of the DC overhead wire 1 into a voltage of the power storage device 52 and charges the power storage device 52 via the reactor 72. When an operation command "discharge" is input, the control device 100 converts a voltage of the power storage device 52 into an overhead wire voltage of the DC overhead wire 1 with the second power converter 51 and discharges the overhead wire voltage to the DC overhead wire 1.

When an operation command "start (engine start)" is input, the control device 100 turns on the third line breaker 55 and charges the second filter capacitor 59 via the second filter reactor 58 while limiting an electric current with the second charging resistor 57. When the control device 100 confirms with a voltage detected by the second filter capacitor voltage detector 66 that the second filter capacitor 59 is charged up to the predetermined voltage, the control device 100 turns on the fourth line breaker 56 and short-circuits the second charging resistor 57. Further, the control device 100 turns on the third contactor 61. The second power converter 51 converts direct-current power into alternating-current power and drives the generator 6 to start the engine 5. Note that, after the driving of the generator 6, control for supplying excess power of the generator 6 to the DC overhead wire 1 through the second power converter 51 or control for charging the power storage device 52 with the excess power is performed according to necessity.

When an operation command "power running by stored power" is input, the control device 100 turns on the third line breaker 55 and charges the second filter capacitor 59 via the second filter reactor 58 while limiting an electric current with the second charging resistor 57. When the control device 100 detects with the second filter capacitor voltage detector 66 that the second filter capacitor 59 is charged up to the predetermined voltage, the control device 100 turns on the fourth line breaker 56 and short-circuits the second charging resistor 57. The control device 100 converts direct-current power into alternating-current power with the first power converter 21 and drives the motor 23 to cause the vehicle to travel.

After the power running, when the operation command "brake" is input, the control device 100 causes the motor 23 to operate as the generator, converts generated alternating-current power into direct-current power with the first power converter 21, and charges the power storage device 52. When the power storage device 52 is fully charged, the control device 100 stops the charging and stops the vehicle with the not-shown air brake.

When an operation command "power running by generated power" is input, the control device 100 converts generated power of the generator 6 driven by the engine 5 into direct-current power with the power converter 51, converts the direct-current power into alternating-current power with the first power converter 21 to drive the motor 23, and causes the vehicle to travel. Note that the control device 100 performs control for adjusting charging and discharging of generated power and stored power according to power running power.

Operations by traveling sections (an electrified section and a non-electrified section) in the propulsion control apparatus in the first embodiment are explained.

First, an operation during electrified section traveling is explained. As a preparation for starting traveling in the electrified section, the control device 100 turns off the first contactor 63, separates the power storage device 52 from the direct-current common section 90, turns off the third contactor 61, and separates the generator 6 from the second power converter 51. The control device 100 turns on the second circuit breaker 64, turns on the second contactor 70, connects the power storage device 52 to the second power converter 51 via the reactor 72, and causes the second power converter 51 to operate as the DC/DC converter.

When the control device 100 receives a "power running command" from the motorman's cab, the control device 100 lifts the DC pantograph 2 and receives direct-current power from the DC overhead wire 1. At this point, the control device 100 turns on the first circuit breaker 11 and supplies the direct-current power of the DC overhead wire 1 to the direct-current common section 90. The control device 100 charges the first filter capacitor 29 with the first line breaker 25, the second line breaker 26, and the first charging resistor 27, causes the first power converter 21 to operate as the DC/AC converter, converts the direct-current power into alternating-current power, and drives the motor 23 to cause the vehicle to travel. The control device 100 causes the second power converter 51 to operate as the DC/DC converter, converts an output voltage of the power storage device 52 into an overhead wire voltage, and supplements the direct-current power to suppress fluctuation in the overhead wire voltage.

Thereafter, when the control device 100 receives a "brake command" from the motorman's cab, the control device 100 causes the motor 23 to operate as the generator, causes the first power converter 21 to operate as the AC/DC converter, converts the alternating-current power into a direct-current power, and returns the direct-current power to the DC overhead wire 1. Note that a part of the electric power is supplied to the auxiliary machine 4 from the SIV 3. When the voltage of the DC overhead wire 1 is higher than the predetermined voltage, the electric power cannot be returned to the DC overhead wire 1. Therefore, the control device 100 causes the second power converter 51 to operate as the DC/DC converter and charges excess power in the power storage device 52.

Note that, when the SOC of the power storage device 52 is higher than a predetermined value, the charging in the power storage device 52 cannot be performed. Therefore, in a state in which the power storage device 52 is separated from the direct-current common section 90, the control device 100 converts regenerative power into direct-current power with the first power converter 21, converts the direct-current power into alternating-current power with the second power converter 51, drives the generator 6 as a motor, and consumes the regenerative power with the engine 5.

On the other hand, contrary to the above, when the SOC of the power storage device 52 is lower than the predetermined value, the control device 100 turns on the second circuit breaker 64, turns on the second contactor 70, causes the second power converter 51 to operate as the DC/DC converter, and charges the regenerative power in the power storage device 52 via the reactor 72.

Next, an operation during non-electrified section traveling is explained. The control device 100 turns off the first contactor 63, separates the power storage device 52 from the direct-current common section 90, turns off the third contactor 61, and separates the generator 6 from the second power converter 51. The control device 100 turns on the second circuit breaker 64, turns on the second contactor 70, connects the power storage device 52 to the second power converter 51 via the reactor 72, and causes the second power converter 51 to operate as the DC/DC converter. The control device 100 converts discharged power in the power storage device 52 into direct-current power with the second power converter 51, causes the first power converter 21 to operate as the DC/AC converter, converts the direct-current power into alternating-current to drive the motor 23, and causes the vehicle to travel. In this embodiment, because the vehicle travels with electric power of the power storage device 52, noise is extremely low.

Thereafter, when it is determined according to predetermined speed, a predetermined distance, a predetermined time, or the like that the vehicle has left a place crowded with people such as a station, the control device 100 converts the discharged power (direct-current power) of the power storage device 52 into alternating-current power with the second power converter 51, drives the generator 6 as the motor, and starts the engine 5. Further, the control device 100 controls the second circuit breaker 64 to be turned off, controls the first contactor 63 to be turned off, and releases the power storage device 52 from the direct-current common section 90. The control device 100 causes the second power converter 51 to operate as the DC/DC converter, converts the generated power (alternating-current power) driven by the engine 5 into direct-current power, converts the direct-current power into alternating-current power with the first power converter 21 to drive the motor 23, and accelerates the vehicle. Note that, at this point, the second power converter 51 is controlled such that a direct-current voltage, which is an output voltage, is fixed. That is, in the control, electric power contributing to the vehicle traveling is the generated power of the generator 6 rather than the electric power of the power storage device 52.

Further, the control device 100 performs control for increasing an intermediate direct-current voltage (the voltage of the direct-current common section 90) with the second power converter 51 and controls the intermediate direct-current voltage to be a DC overhead wire voltage. At this point, it is preferable to adjust the method of increasing the direct-current voltage not to change the pulse mode of the first power converter 21. According to such control, an effect is obtained that it is possible to prevent a change of electromagnetic sound due to the change of the pulse mode (an asynchronous PWM, a synchronous PWM, etc.) of the first power converter 21 and it is made possible to suppress unpleasant sound due to a change of the electromagnetic sound.

By increasing the intermediate direct-current voltage, it is made possible to equalize motor performance during traveling under an overhead wire to the motor performance obtained when the overhead wire power is used. There is an effect in a reduction of the size and the weight of the apparatus.

When the control device 100 receives the "brake command" from the motorman's cab during the traveling of the vehicle, the control device 100 changes the braking method according to vehicle speed and the charging state (the SOC) of the power storage device 52. This is because the magnitude of regenerative power is substantially proportional to the level of the speed of the vehicle and, therefore, regenerative power that can be charged in the power storage device is limited by the charging state of the power storage device. As a result, the remaining electric power is consumed by the engine 5 and the generator 6 or the vehicle is stopped by the not-shown air brake. A part of the electric power is supplied to the auxiliary machine 4 from the SIV 3 and consumed.

When the vehicle speed is high and the SOC is high, the regenerative power can hardly be charged in the power storage device 52. Therefore, in a state in which the power storage device 52 is separated from the direct-current common section 90, the control device 100 causes the motor 23 to operate as the generator, converts the regenerative power into direct-current power with the first power converter 21, further converts the direct-current power into alternating-current power with the second power converter 51, drives the generator 6 as the motor, and consumes the regenerative power with the engine 5.

When the vehicle speed is high and the SOC is low, the control device 100 turns on the second circuit breaker 64, turns on the second contactor 70, causes the second power converter 51 to operate as the DC/DC converter, and charges the regenerative power in the power storage device 52 via the reactor 72.

On the other hand, when the vehicle speed is low, the control device 100 turns on the second circuit breaker 64, turns on the first contactor 63, connects the power storage device 52 to the direct-current common section 90, and charges the power storage device 52 with the regenerative power supplied from the first power converter 21.

Figure 2:
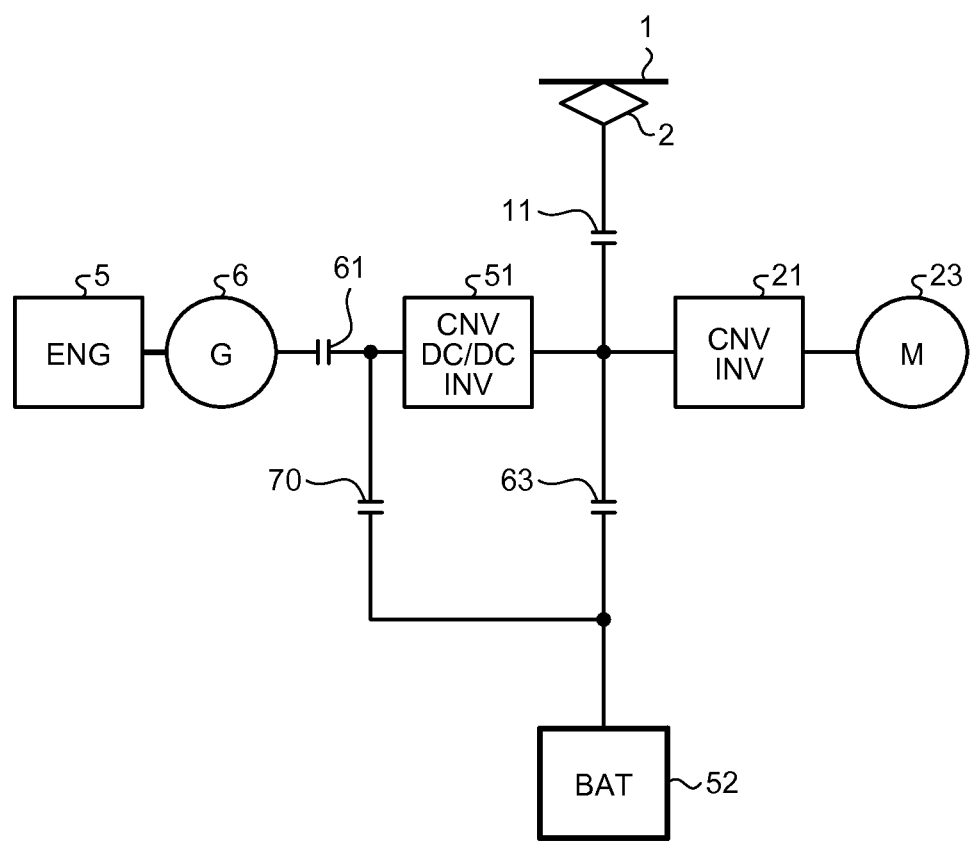
FIG. 2 is a schematic configuration diagram for explaining operations corresponding to respective modes of the propulsion control apparatus according to the first embodiment.

Next, operations by modes in the propulsion control apparatus in the first embodiment are explained. FIG. 2 is a schematic configuration diagram for explaining operations corresponding to the modes of the propulsion control apparatus according to the first embodiment. As shown in the schematic diagram, the direct-current overhead wire 1, the first power converter 21, the second power converter 51, and the power storage device 52 are electrically connected via the direct-current common section 90. The power storage device 52 is also electrically connected to a first input and output end located on the opposite side of the direct-current common section 90 in the second power converter 51.

Note that, in FIG. 2, the engine 5, the motor 23, and the power storage device 52 in the configuration shown in FIG. 1 are respectively written as "ENG", "M", and "BAT". The first power converter 21 and the second power converter 51 are written by focusing on functions thereof.

Specifically, when the first power converter 21 operates as the AC/DC converter, the first power converter 21 is written as "CNV". When the first power converter 21 operates as the DC/AC converter, the first power converter 21 is written as "INV". Similarly, when the second power converter 51 operates as the AC/DC converter, the second power converter 51 is written as "CNV". When the second power converter 51 operates as the DC/AC converter, the second power converter 51 is written as "INV". When the second power converter 51 operates as the DC/DC converter, the second power converter 51 is written as "DC/DC". Note that, in the following explanation, a nominal voltage of the DC overhead wire 1 is set to, for example, 1500 Vdc and a full-charge voltage of the power storage device 52 is set to, for example, 600 Vdc.

(a-1: Start)

Figure 3:
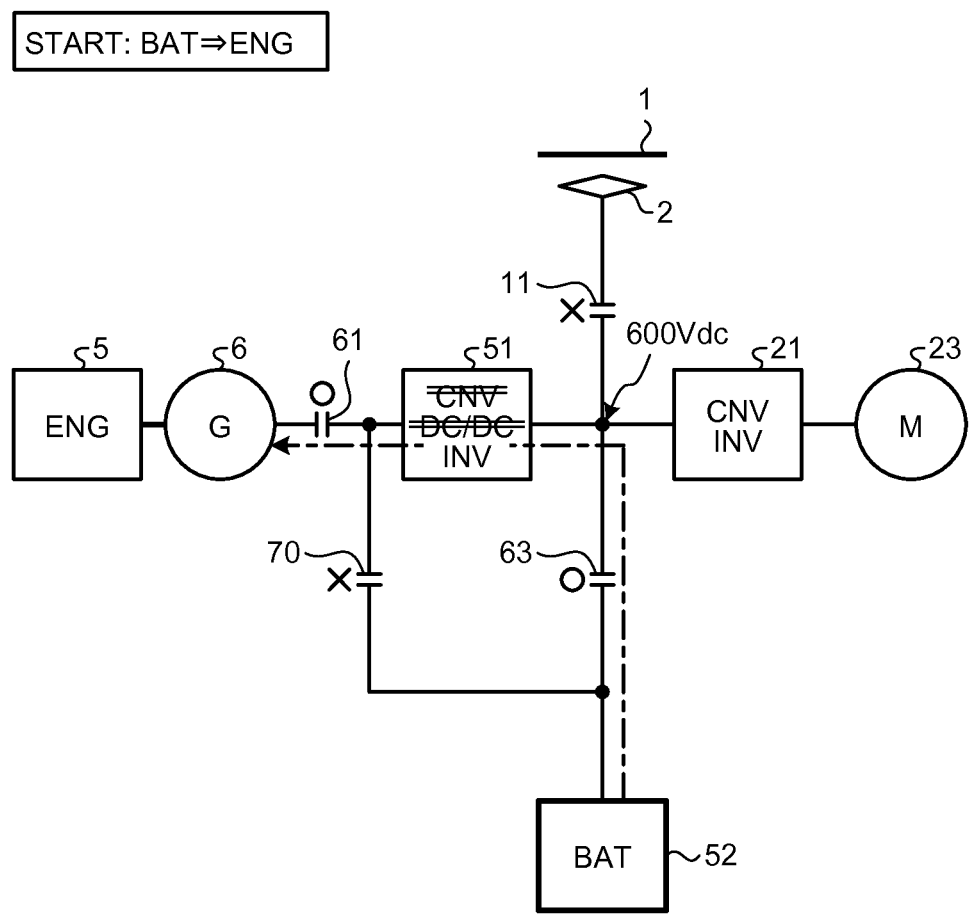
FIG. 3 is a diagram of an operation in performing an engine start using electric power of a power storage device.

FIG. 3 is a diagram of an operation in performing an engine start using electric power of the power storage device 52. As shown in the figure, when the engine start is performed using the electric power of the power storage device 52, the DC pantograph 2 is lowered, the first circuit breaker 11 is controlled to be turned off, the third contactor 61 is controlled to be turned on, the first contactor 63 is controlled to be turned on, and the second contactor 70 is controlled to be turned off. Under the control, the second power converter 51 operates as the DC/AC converter (INV), converts a low direct-current voltage applied from the power storage device 52 into a three-phase alternating-current voltage to drive the generator 6 as the motor, and starts the engine 5 connected to the generator 6.

(a-2: Power Running)

Figure 4:
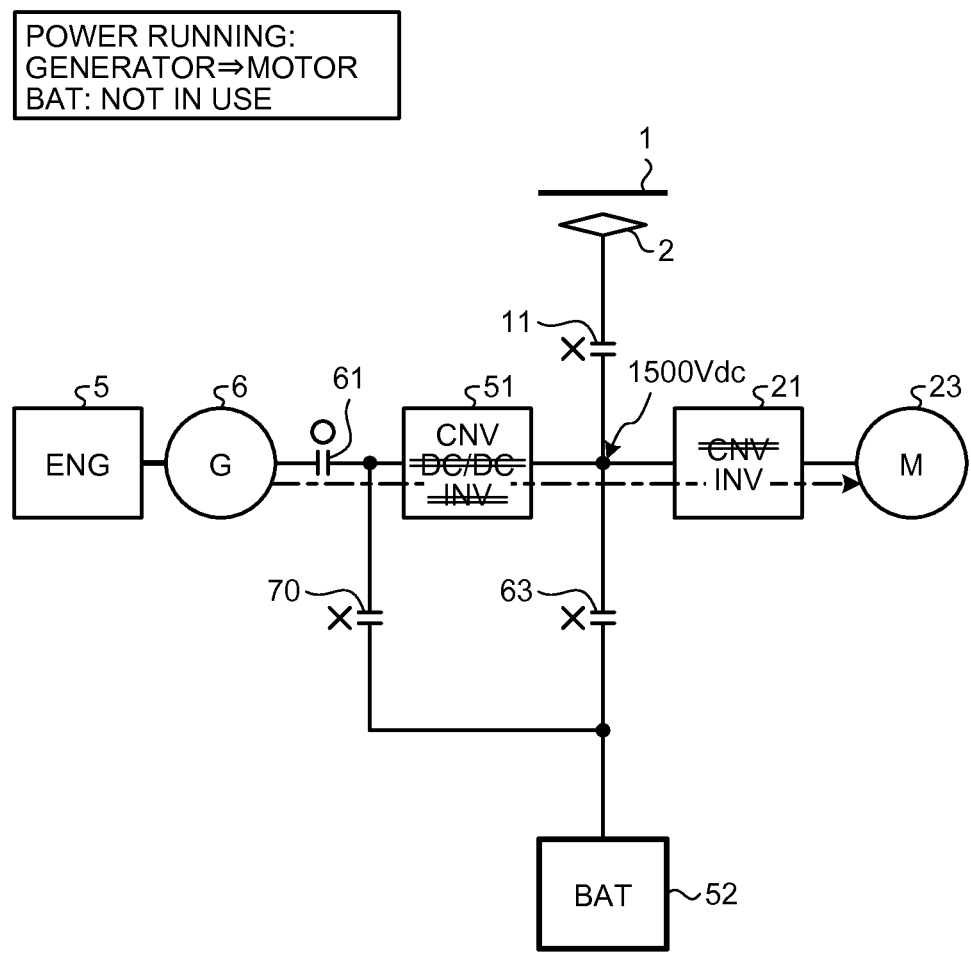
FIG. 4 is a diagram of an operation in driving a motor using generated power of a generator.

FIG. 4 is a diagram of an operation in driving the motor 23 using generated power of the generator 6. In such control, it is assumed that, for example, the power storage device 52 is not used or the power storage device 52 has broken down. As shown in the figure, when the motor 23 is driven using the generated power of the generator 6, the DC pantograph 2 is lowered, the first circuit breaker 11 is controlled to be turned off, the third contactor 61 is controlled to be turned on, the first contactor 63 is controlled to be turned off, and the second contactor 70 is controlled to be turned off. Under the control, the second power converter 51 operates as the AC/DC converter (CNV). The first power converter 21 operates as the DC/AC converter (INV) to drive the motor 23. Note that, in the control, the second power converter 51 is controlled such that the voltage of the direct-current common section changes to a high voltage (near 1500 Vdc) adjusted to the overhead wire voltage. That is, the voltage of the direct-current common section is controlled to different voltages during the start (departure) of the vehicle and during the power running.

(a-3: Power Running+Discharging)

Figure 5:
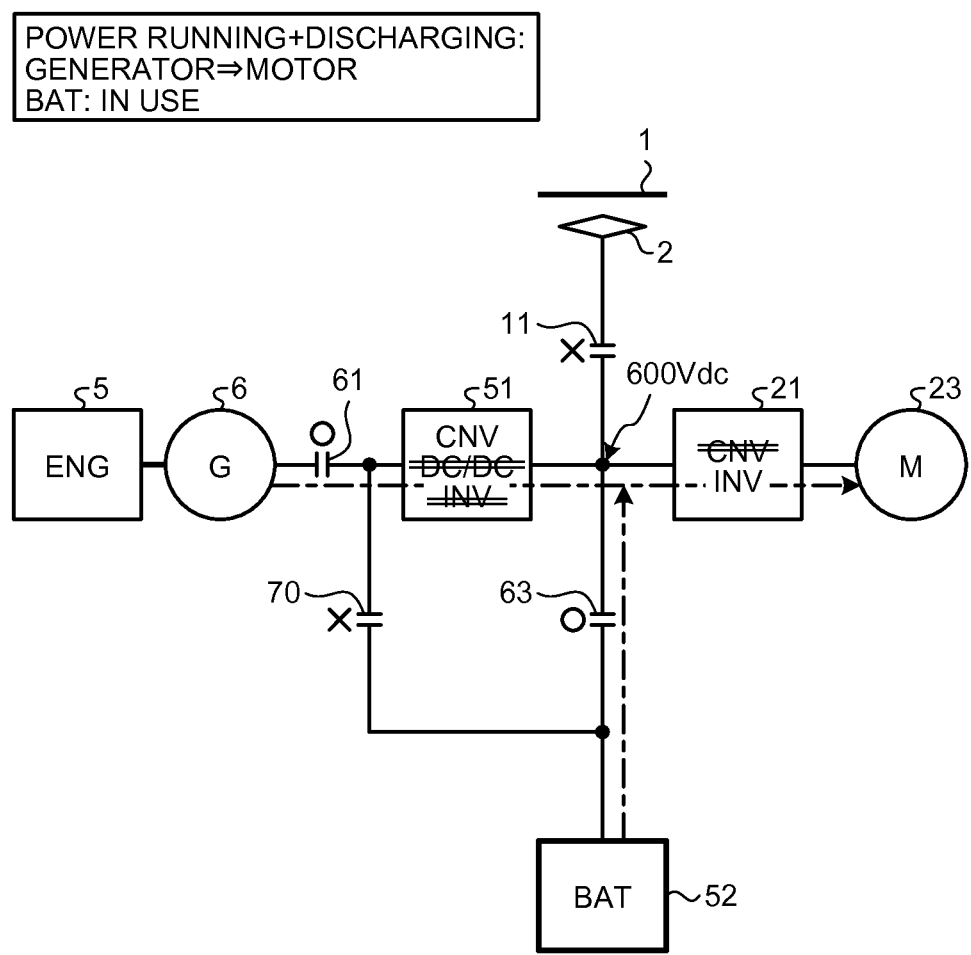
FIG. 5 is a diagram of an operation in driving the motor 23 using both of generated power of the generator and stored power of the power storage device.

FIG. 5 is a diagram of an operation in driving the motor 23 using both of the generated power of the generator 6 and the stored power of the power storage device 52. As shown in the figure, when the motor 23 is driven using the generated power of the generator 6 and the stored power of the power storage device 52, the DC pantograph 2 is lowered, the first circuit breaker 11 is controlled to be turned off, the third contactor 61 is controlled to be turned on, the first contactor 63 is controlled to be turned on, and the second contactor 70 is controlled to be turned off. Under the control, the second power converter 51 operates as the AC/DC converter. The first power converter 21 receives the direct-current powers from the second power converter 51 and the power storage device 52 to operate as the DC/AC converter and drives the motor 23. Note that, in the control, the second power converter 51 is controlled such that the voltage of the direct-current common section changes to 600 Vdc adjusted to the voltage (near 600 Vdc) of the power storage device 52 or a voltage near 600 Vdc (hereinafter referred to as "low voltage").

(a-4: Power Running)

Figure 6:
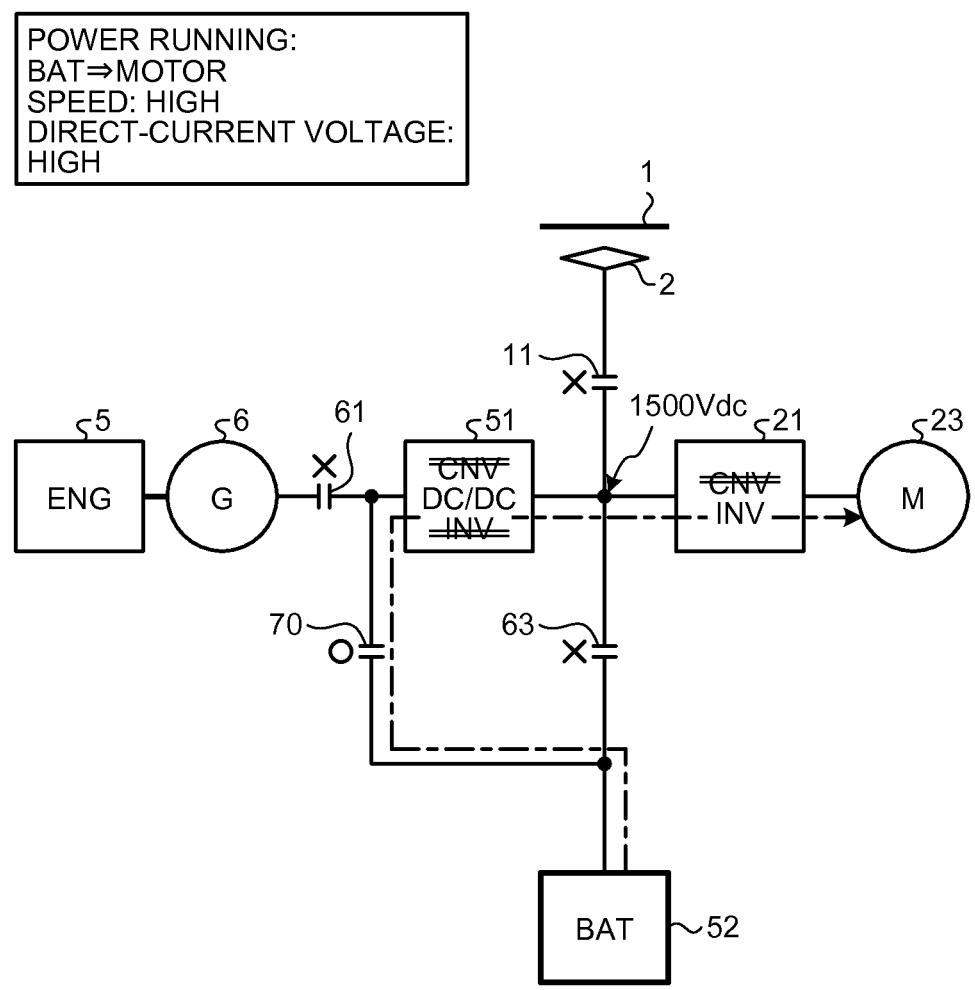
FIG. 6 is a diagram of an operation in driving the motor using only the stored power of the power storage device.

FIG. 6 is a diagram of an operation in driving the motor 23 using only the stored power of the power storage device 52. As shown in the figure, when the motor 23 is driven using only the stored power of the power storage device 52, the DC pantograph 2 is lowered, the first circuit breaker 11 is controlled to be turned off, the third contactor 61 is controlled to be turned off, the first contactor 63 is controlled to be turned off, and the second contactor 70 is controlled to be turned on. Under the control, the second power converter 51 operates as the DC/DC converter. The first power converter 21 operates as the DC/AC converter and drives the motor 23. Note that, in the control, the second power converter 51 is controlled such that the voltage of the direct-current common section changes to the high voltage (near 1500 Vdc) adjusted to the overhead wire voltage. Therefore, it is possible to keep an input voltage to the first power converter 21 high and drive the vehicle at high speed.

(a-5: Power Running)

Figure 7:
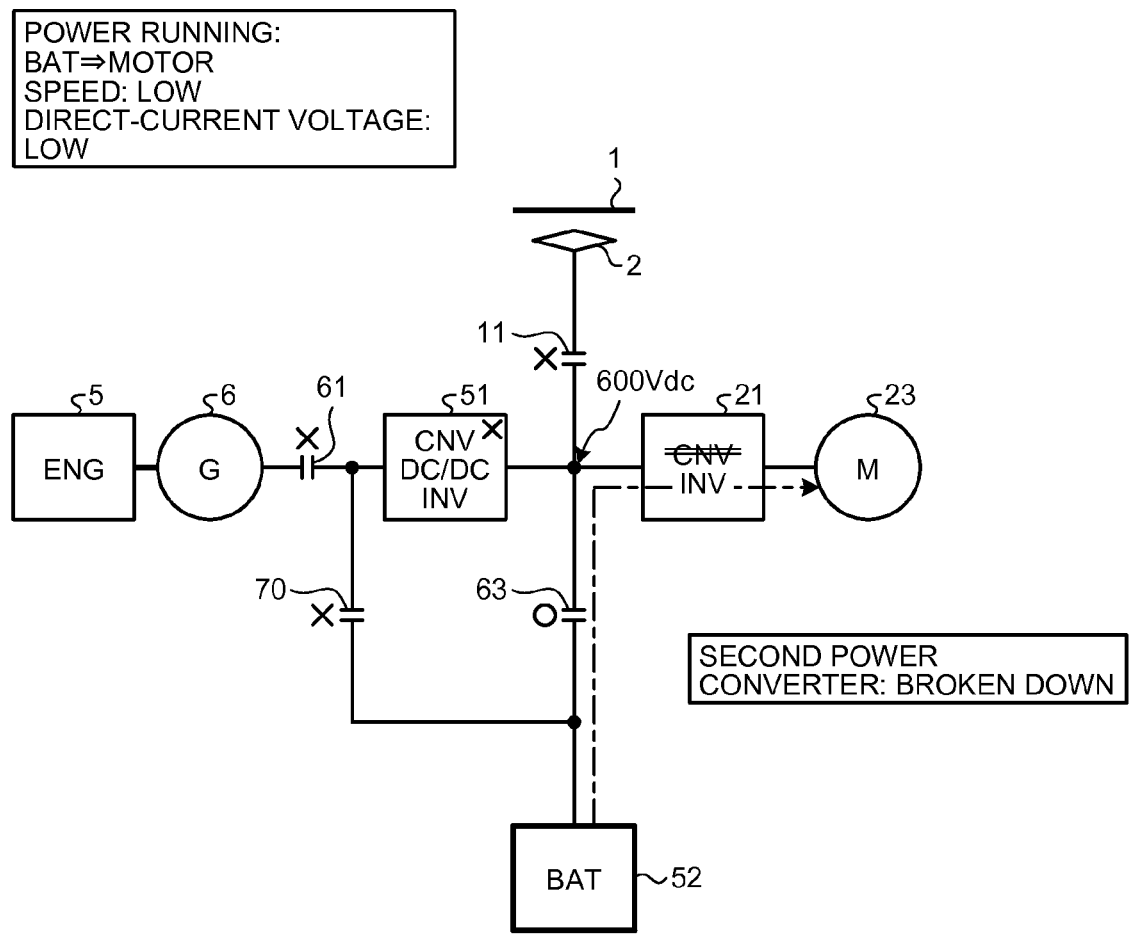
FIG. 7 is a diagram of an operation different from FIG. 6 in driving the motor using only the stored power of the power storage device.

FIG. 7 is a diagram of an operation different from FIG. 6 in driving the motor 23 using only the stored power of the power storage device 52. When the motor 23 is driven using only the stored power of the power storage device 52, control can be performed as shown in FIG. 7 different from the control shown in FIG. 6. Such control assumes that, for example, the second power converter 51 has broken down. In the case of FIG. 7, the DC pantograph 2 is lowered, the first circuit breaker 11 is controlled to be turned off, the third contactor 61 is controlled to be turned off, the first contactor 63 is controlled to be turned on, and the second contactor 70 is controlled to be turned off. Under the control, the first power converter 21 receives the direct-current power from the power storage device 52 to operate as the DC/AC converter and drives the motor 23. Note that, in the control, the voltage of the power storage device 52 is directly applied to the direct-current common section. Therefore, the voltage of the direct-current common section changes to the low voltage (near 600 Vdc). Therefore, the operation of the first power converter 21 is limited and the vehicle is driven at low speed.

(a-6: Regeneration)

Figure 8:
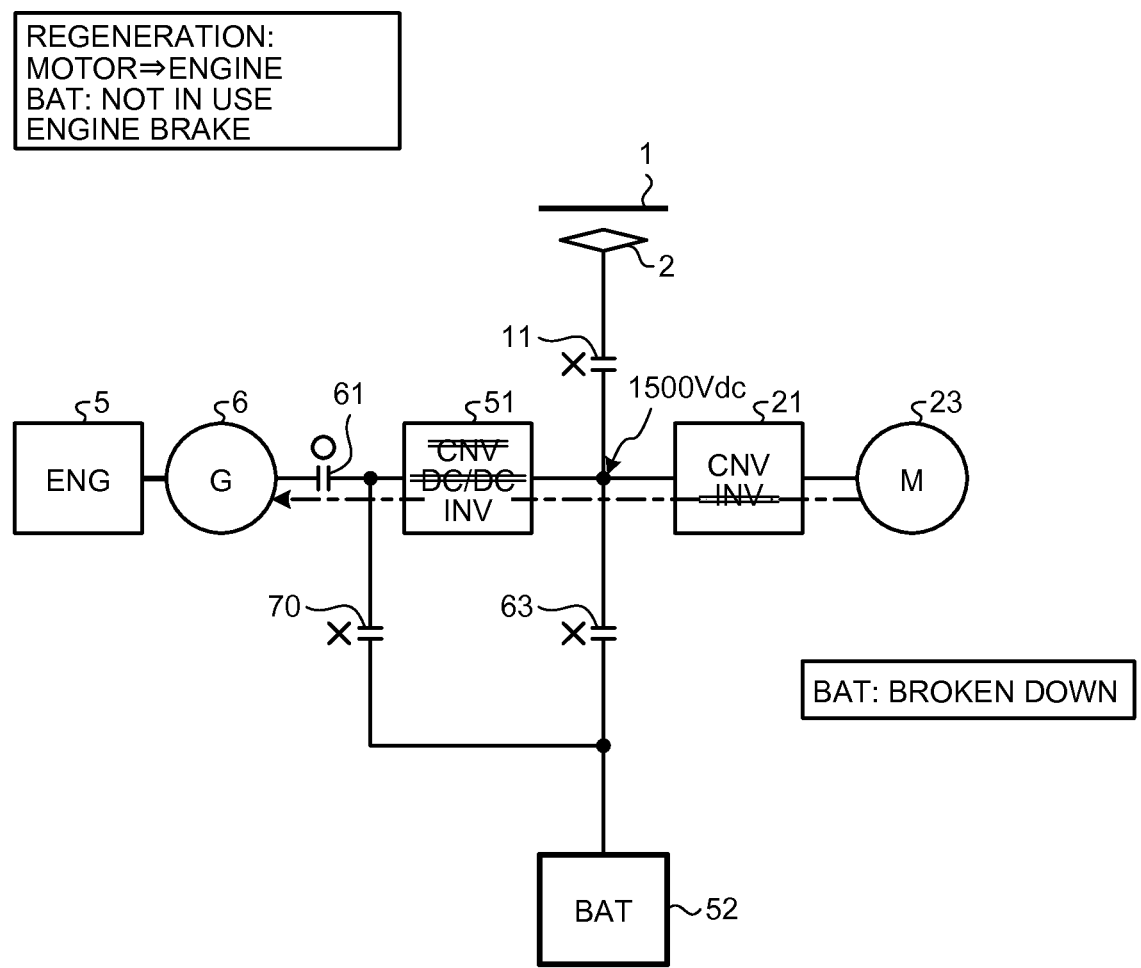
FIG. 8 is a diagram of an operation in using regenerative power of the motor as an engine brake.

FIG. 8 is a diagram of an operation in using the regenerative power of the motor 23 as the engine brake. As shown in the figure, when the regenerative power of the motor 23 is used as the engine brake, the DC pantograph 2 is lowered, the first circuit breaker 11 is controlled to be turned off, the third contactor 61 is controlled to be turned on, the first contactor 63 is controlled to be turned off, and the second contactor 70 is controlled to be turned off. Under the control, the first power converter 21 receives the regenerative power of the motor 23 to operate as the AC/DC converter. The second power converter 51 operates as the DC/AC converter (INV) and drives the generator 6 to apply the engine brake. Note that, in the control, the power storage device 52 is separated from the direct-current common section. Therefore, the voltage of the direct-current common section is controlled to the high voltage (near 1500 Vdc).

(a-7: Regeneration+Charging/Engine Brake)

Figure 9:
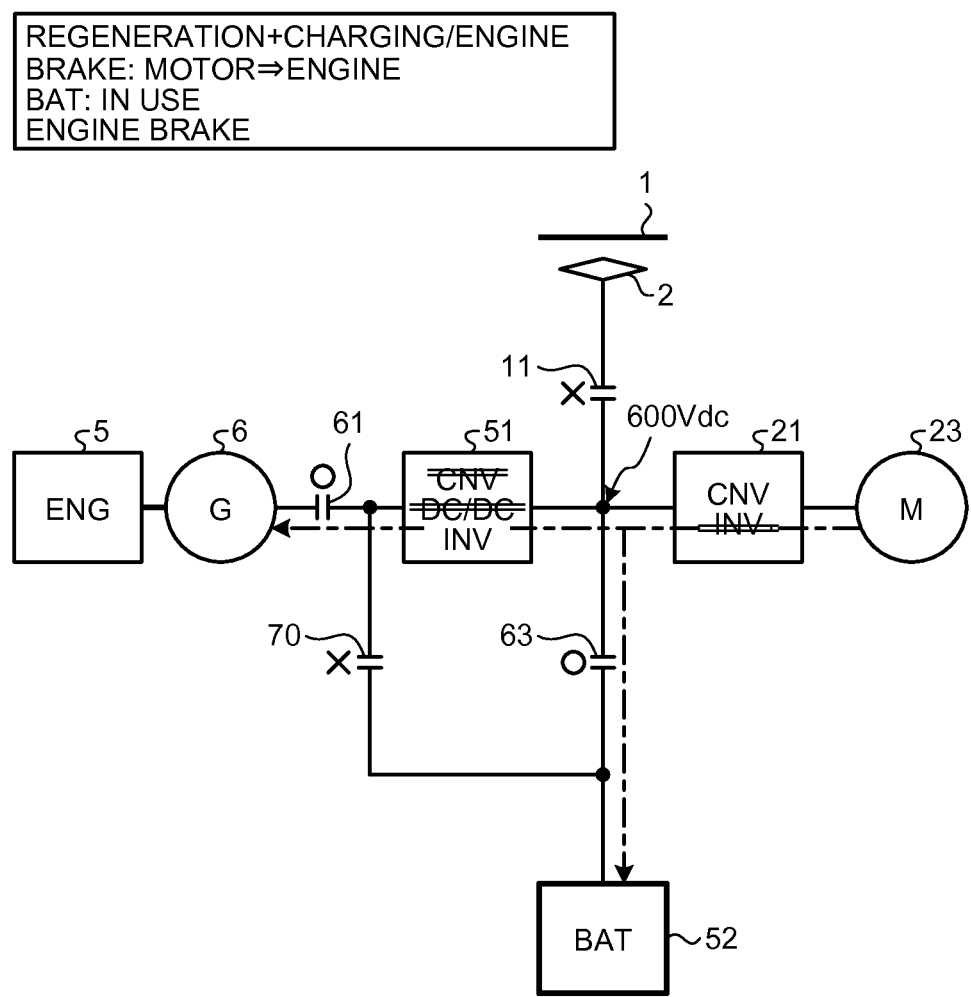
FIG. 9 is a diagram of an operation in using the regenerative power of the motor as the engine brake and charged power.

FIG. 9 is a diagram of an operation in using the regenerative power of the motor 23 as the engine brake and the charged power. As shown in the figure, when the regenerative power of the motor 23 is used as the engine brake and the charged power, the DC pantograph 2 is lowered, the first circuit breaker 11 is controlled to be turned off, the third contactor 61 is controlled to be turned on, the first contactor 63 is controlled to be turned on, and the second contactor 70 is controlled to be turned off. Under the control, the first power converter 21 receives the regenerative power of the motor 23 to operate as the AC/DC converter and charges the power storage device 52. The second power converter 51 operates as the DC/AC converter, drives the generator 6 using the excess power supplied from the first power converter 21, and applies the engine brake. Note that, in the control, the power storage device 52 is connected to the direct-current common section. Therefore, the voltage of the direct-current common section is controlled to the low voltage (near 600 Vdc).

(a-8: Regeneration+Charging)

Figure 10:
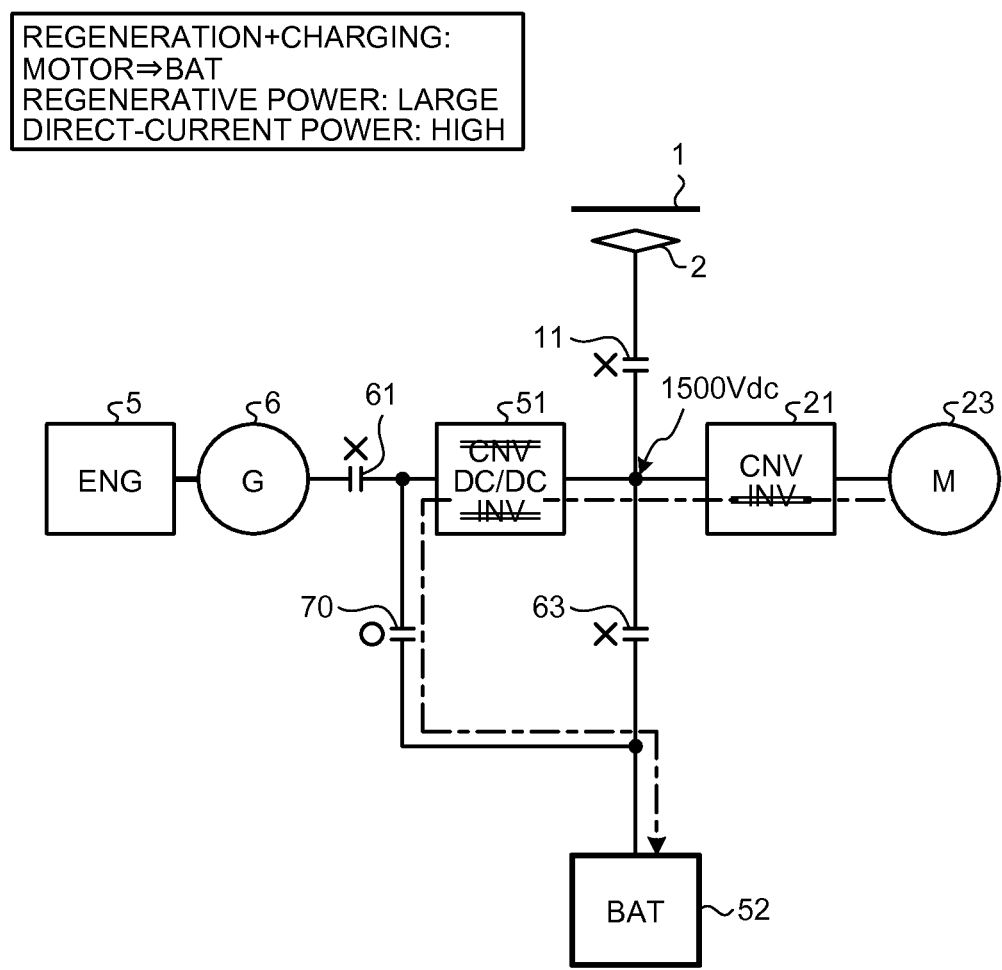
FIG. 10 is a diagram of an operation in using all the regenerative power of the motor as the charged power.

FIG. 10 is a diagram of an operation in using all the regenerative power of the motor 23 as the charged power. As shown in the figure, when all the regenerative power of the motor 23 is used as the charged power, the DC pantograph 2 is lowered, the first circuit breaker 11 is controlled to be turned off, the third contactor 61 is controlled to be turned off, the first contactor 63 is controlled to be turned off, and the second contactor 70 is controlled to be turned on. Under the control, the first power converter 21 receives the regenerative power of the motor 23 to operate as the AC/DC converter. The second power converter 51 operates as the DC/AC converter and charges the power storage device 52. Note that, in the control, in order to efficiently charge the regenerative power in the power storage device 52, the voltage of the direct-current common section is controlled to the high voltage (near 1500 Vdc).

(a-9: Regeneration+Charging)

Figure 11:
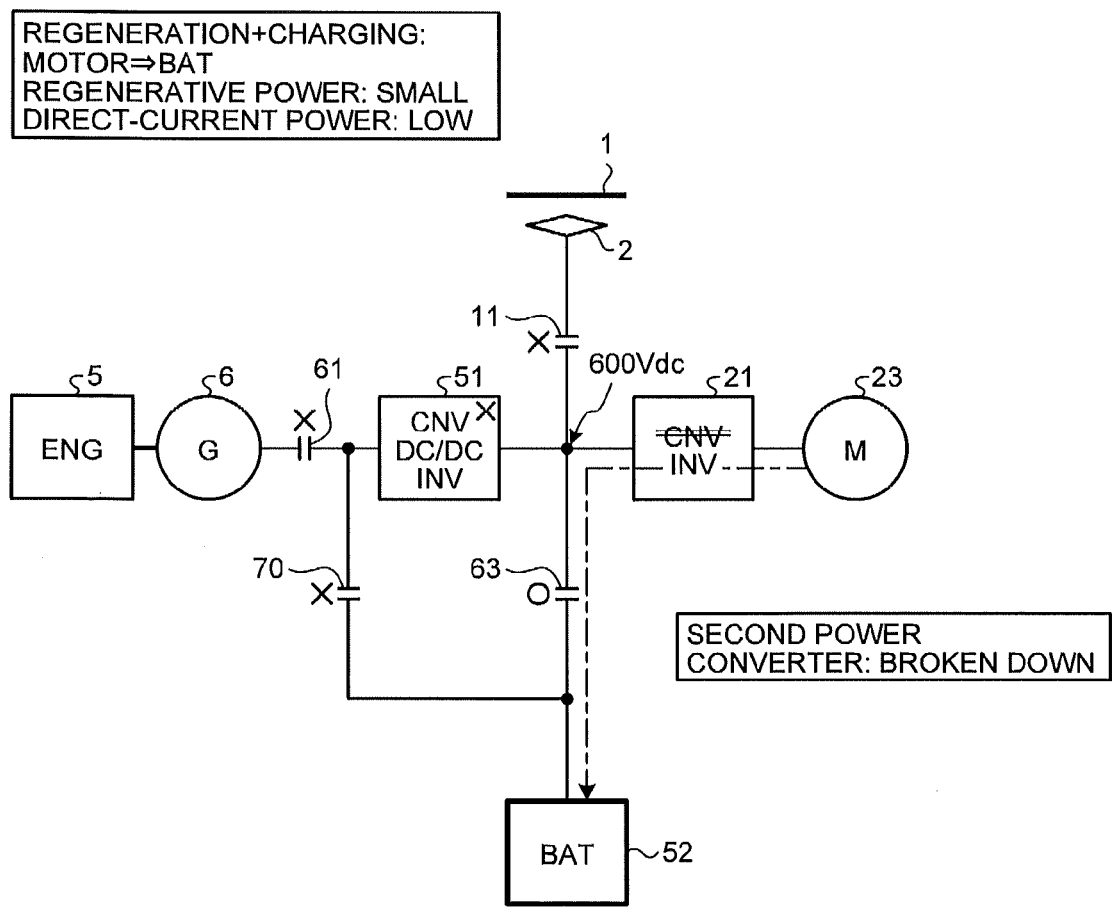
FIG. 11 is a diagram of an operation different from FIG. 10 in using all the regenerative power of the motor as the charged power.

FIG. 11 is a diagram of an operation different from FIG. 10 in using all the regenerative power of the motor 23 as the charged power. When all the regenerative power of the motor 23 is used as the charged power, control can be performed as shown in FIG. 11 different from the control shown in FIG. 10. In such control, it is assumed that, for example, the second power converter 51 has broken down. In the case of FIG. 11, the DC pantograph 2 is lowered, the first circuit breaker 11 is controlled to be turned off, the third contactor 61 is controlled to be turned off, the first contactor 63 is controlled to be turned on, and the second contactor 70 is controlled to be turned off. Under the control, the first power converter 21 receives the regenerative power from the power storage device 52 to operate as the DC/AC converter and charges the power storage device 52. Note that, in the control, the voltage of the power storage device 52 is directly applied to the direct-current common section. Therefore, the voltage of the direct-current common section changes to the low voltage (near 600 Vdc). Therefore, the regenerative power served for the charged power is small compared with the regenerative power in FIG. 10.

(a-10: Mode: Generated Charging)

Figure 12:
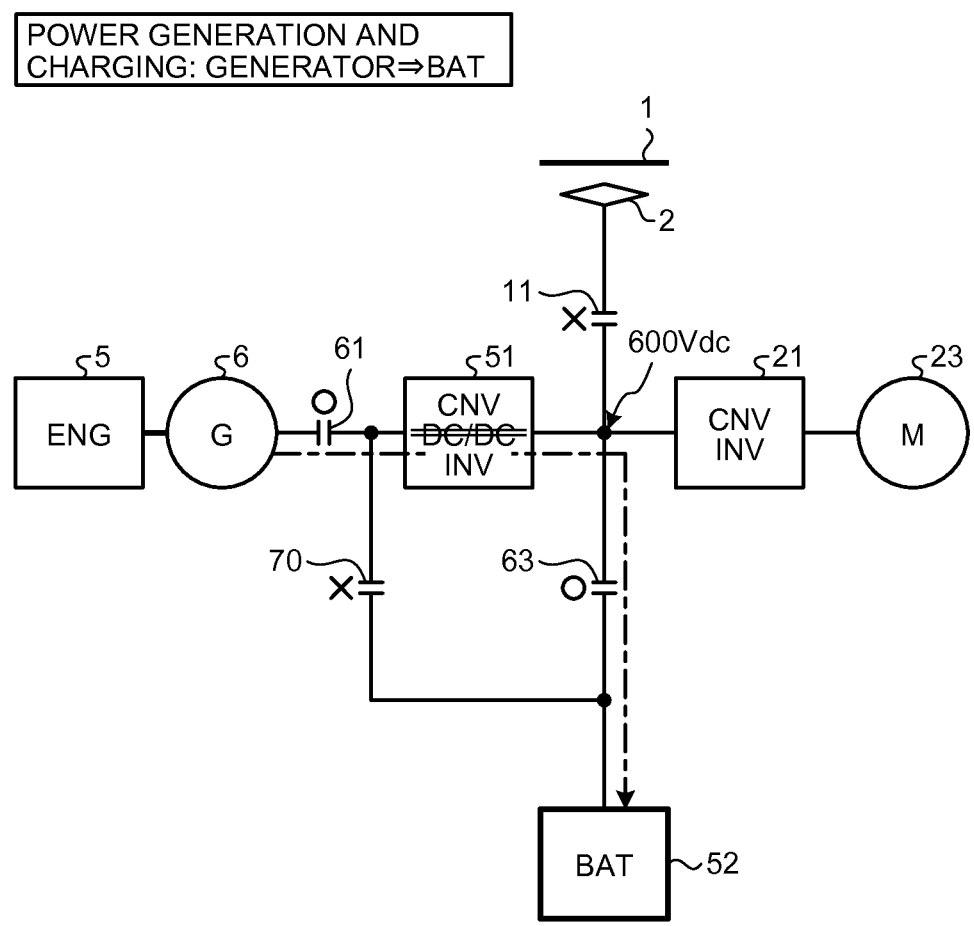
FIG. 12 is a diagram of an operation in charging the power storage device using the generated power of the generator.

FIG. 12 is a diagram of an operation in charging the power storage device 52 using the generated power of the generator 6. As shown in the figure, when the power storage device 52 is charged using the generated power of the generator 6, the DC pantograph 2 is lowered, the first circuit breaker 11 is controlled to be turned off, the third contactor 61 is controlled to be turned on, the first contactor 63 is controlled to be turned on, and the second contactor 70 is controlled to be turned off. Under the control, the second power converter 51 operates as the AC/DC converter (CNV) to charge the power storage device 52. Note that, in the control, the power storage device 52 is connected to the direct-current common section. Therefore, the voltage of the direct-current common section is controlled to the low voltage (near 600 Vdc).

FIG. 13 is a diagram of a list in a table format of the operations shown in FIG. 3 to FIG. 12. Not only operation states or control states of the sections shown in the figures but also control states of the sections corresponding to the diagram of FIG. 1 are shown. "INV", "CNV", and "DC/DC" shown in columns of first and second power converters represent operation states of the first and second power converters. "X" means that the first and second power converters are not used. "OFF" shown in a column of a pantograph means that the DC pantograph 2 is lowered. "Circle" marks shown in columns of first and second circuit breakers, first to fourth line breakers and first to third contactors means a conduction state and "X" in the columns means a non-conduction state. Note that contents shown in the figure are as explained above. Detailed explanation of the contents is omitted.

The above explanation is the explanation of the operation performed when the electric power of the DC overhead wire is not used. An operation performed when the electric power of the DC overhead wire is used is explained below.

(b-1: Start)

Figure 14:
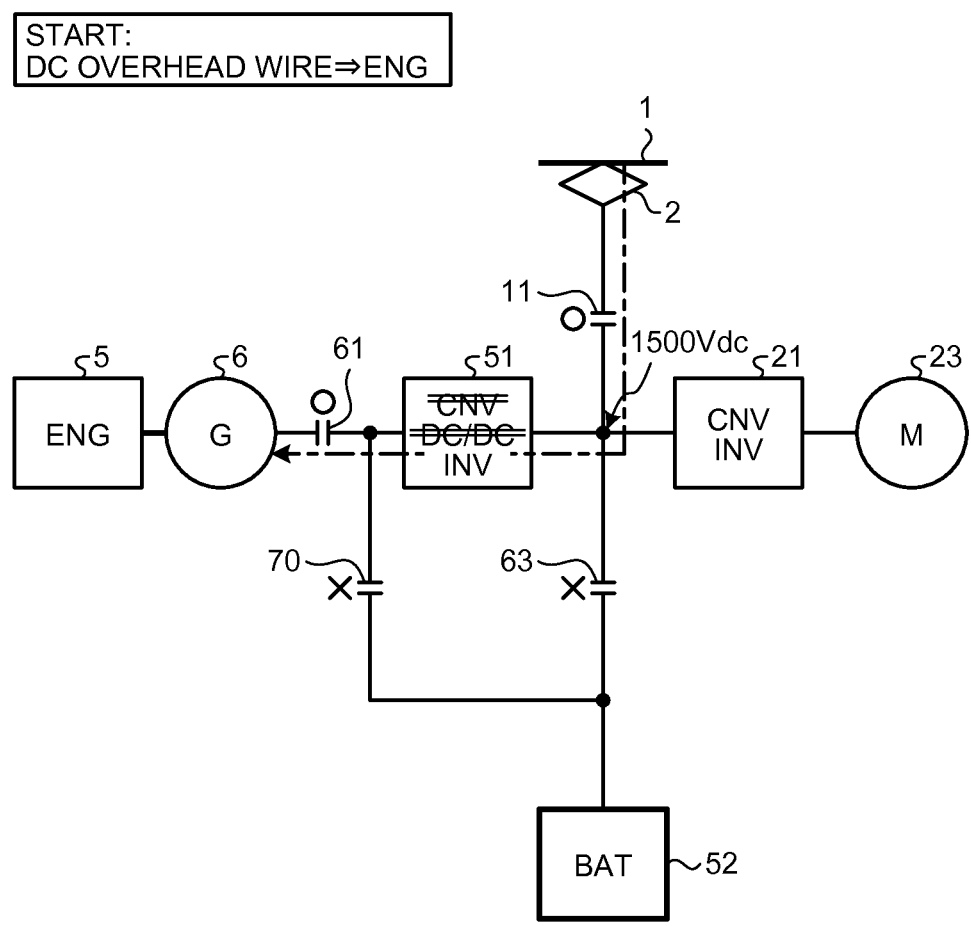
FIG. 14 is a diagram of an operation in performing the engine start using electric power of a DC overhead wire.

FIG. 14 is a diagram of an operation in performing the engine start using the electric power of the DC overhead wire 1. As shown in the figure, when the engine start is performed using the electric power of the DC overhead wire 1, the DC pantograph 2 is lifted, the first circuit breaker 11 is controlled to be turned on, the third contactor 61 is controlled to be turned on, the first contactor 63 is controlled to be turned off, and the second contactor 70 is controlled to be turned off. Under the control, the second power converter 51 operates as the DC/AC converter, converts a high direct-current voltage applied from the DC overhead wire 1 into a three-phase alternating-current voltage to drive the generator 6 as the motor, and starts the engine 5 connected to the generator 6.

(b-2: Power Regeneration)

Figure 15:
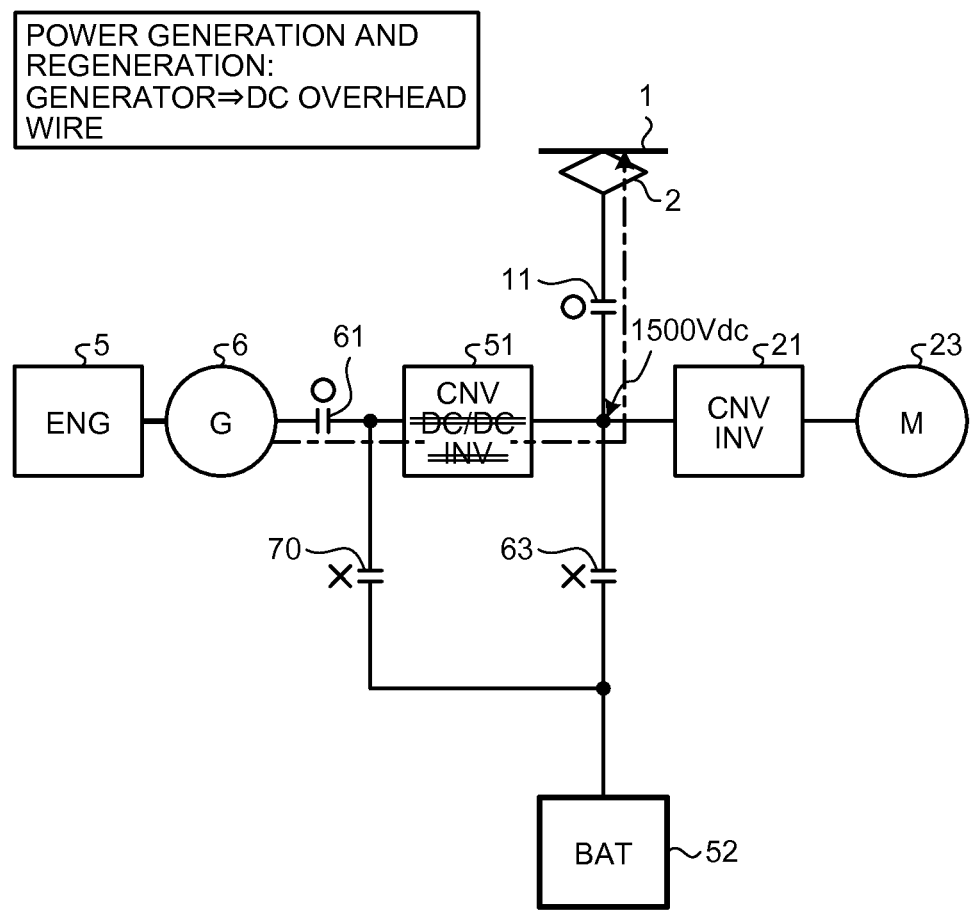
FIG. 15 is a diagram of an operation in regenerating (supplying) the generated power of the generator to the DC overhead wire.

FIG. 15 is a diagram of an operation in regenerating (supplying) the generated power of the generator 6 to the DC overhead wire 1. As shown in the figure, when the generated power of the generator 6 is regenerated to the DC overhead wire 1, the DC pantograph 2 is lifted, the first circuit breaker 11 is controlled to be turned on, the third contactor 61 is controlled to be turned on, the first contactor 63 is controlled to be turned off, and the second contactor 70 is controlled to be turned off. Under the control, the second power converter 51 operates as the AC/DC converter to supply the generated power to the DC overhead wire 1. Note that, in the control, the output voltage of the second power converter 51 is controlled to be the high voltage (near 1500 Vdc) adjusted to the overhead wire voltage.

(b-3: Power Running)

Figure 16:
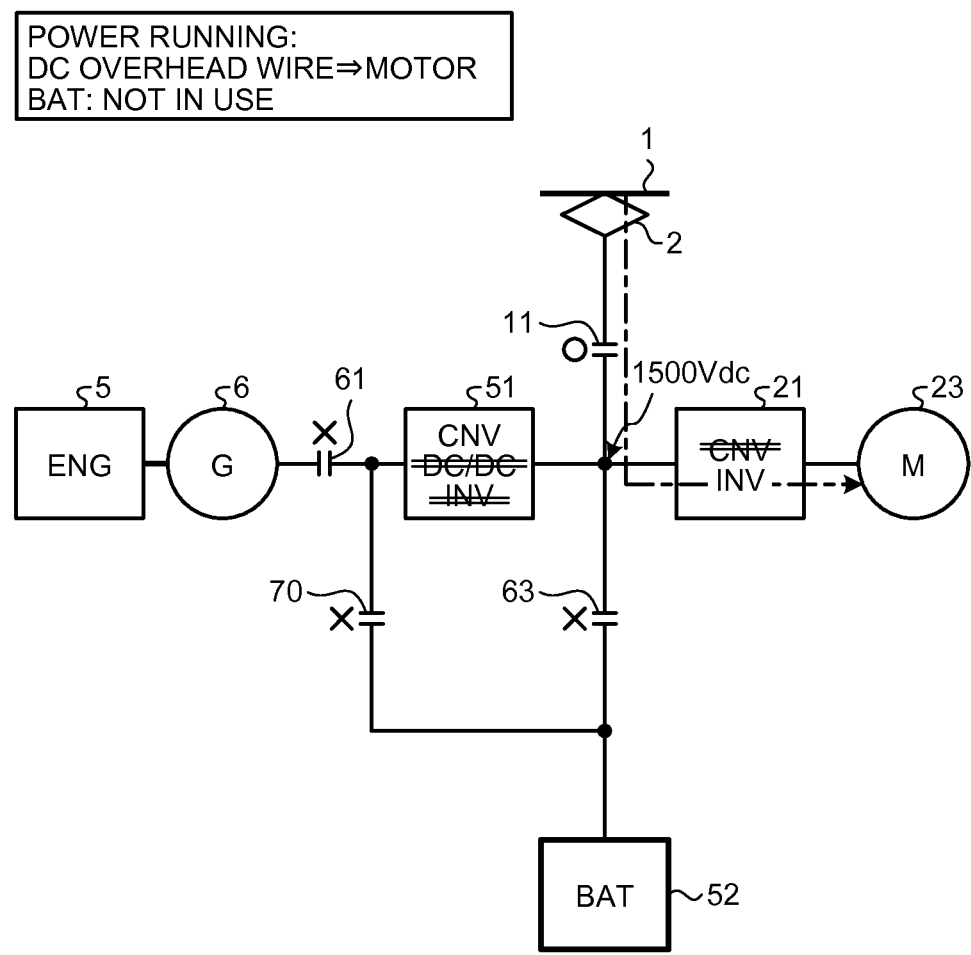
FIG. 16 is a diagram of an operation in driving the motor using the electric power of the DC overhead wire.

FIG. 16 is a diagram of an operation in driving the motor 23 using the electric power of the DC overhead wire 1. As shown in the figure, when the motor 23 is driven using the electric power of the DC overhead wire 1, the DC pantograph 2 is lifted, the first circuit breaker 11 is controlled to be turned on, the third contactor 61 is controlled to be turned off, the first contactor 63 is controlled to be turned off, and the second contactor 70 is controlled to be turned off. Under the control, the first power converter 21 operates as the DC/AC converter and drives the motor 23.

(b-4: Power Running+Power Generation)

Figure 17:
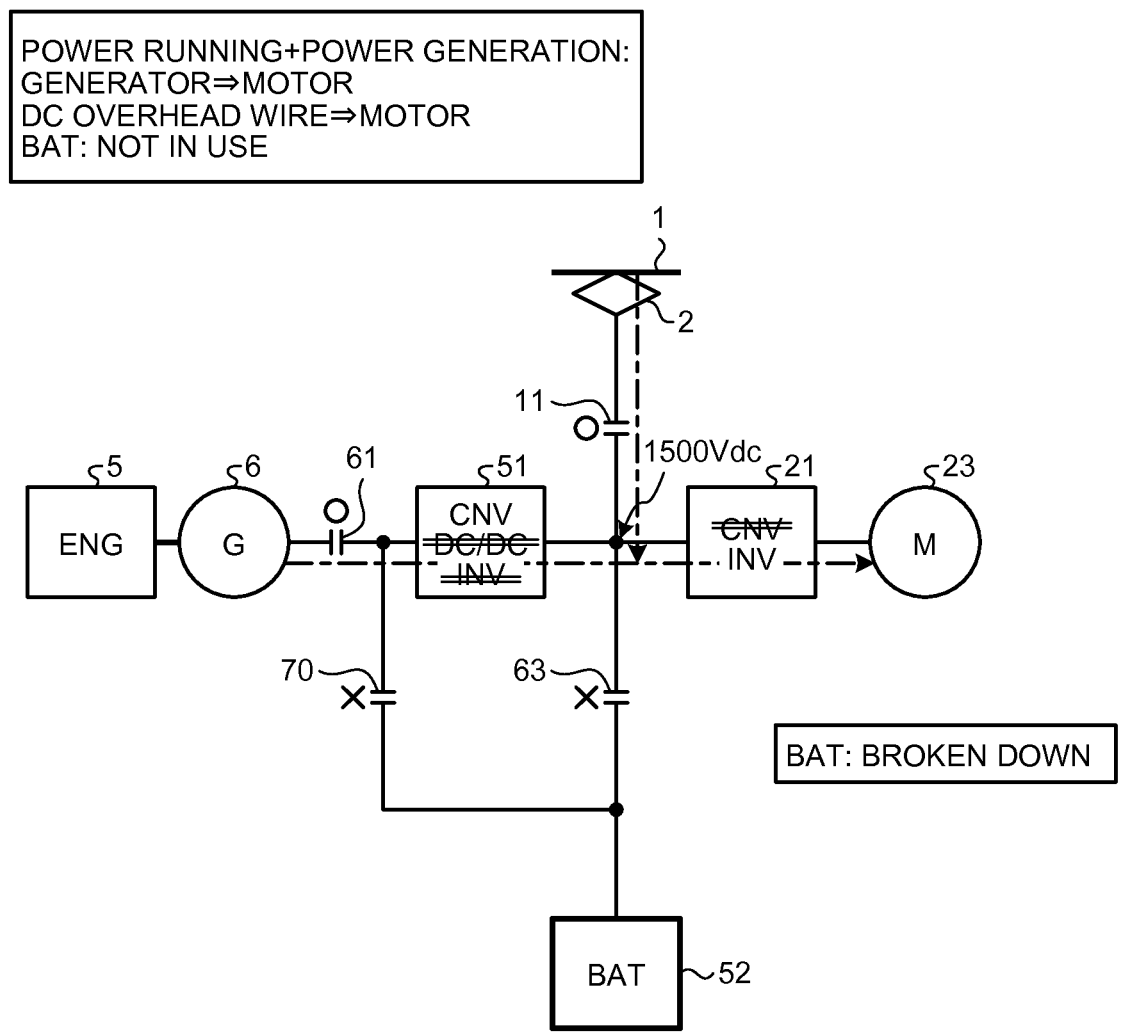
FIG. 17 is a diagram of an operation in driving the motor using both of the electric power of the DC overhead wire and the generated power of the generator.

FIG. 17 is a diagram of an operation in driving the motor 23 using both of the electric power of the DC overhead wire 1 and the generated power of the generator 6. In such control, it is assumed that, for example, the SOC of the power storage device 52 is low or the power storage device 52 has broken down. As shown in the figure, when the motor 23 is driven using the electric power of the DC overhead wire 1 and the generated power of the generator 6, the DC pantograph 2 is lifted, the first circuit breaker 11 is controlled to be turned on, the third contactor 61 is controlled to be turned on, the first contactor 63 is controlled to be turned off, and the second contactor 70 is controlled to be turned off. Under the control, the second power converter 51 operates as the AC/DC converter. The first power converter 21 receives both of the electric power of the second power converter 51 and the overhead wire power to operate as the DC/AC converter and drives the motor 23. Note that, in the control, the second power converter 51 is controlled such that the voltage of the direct-current common section changes to the high voltage (near 1500 Vdc) adjusted to the overhead wire voltage.

(b-5: Power Running+Discharging)

Figure 18:
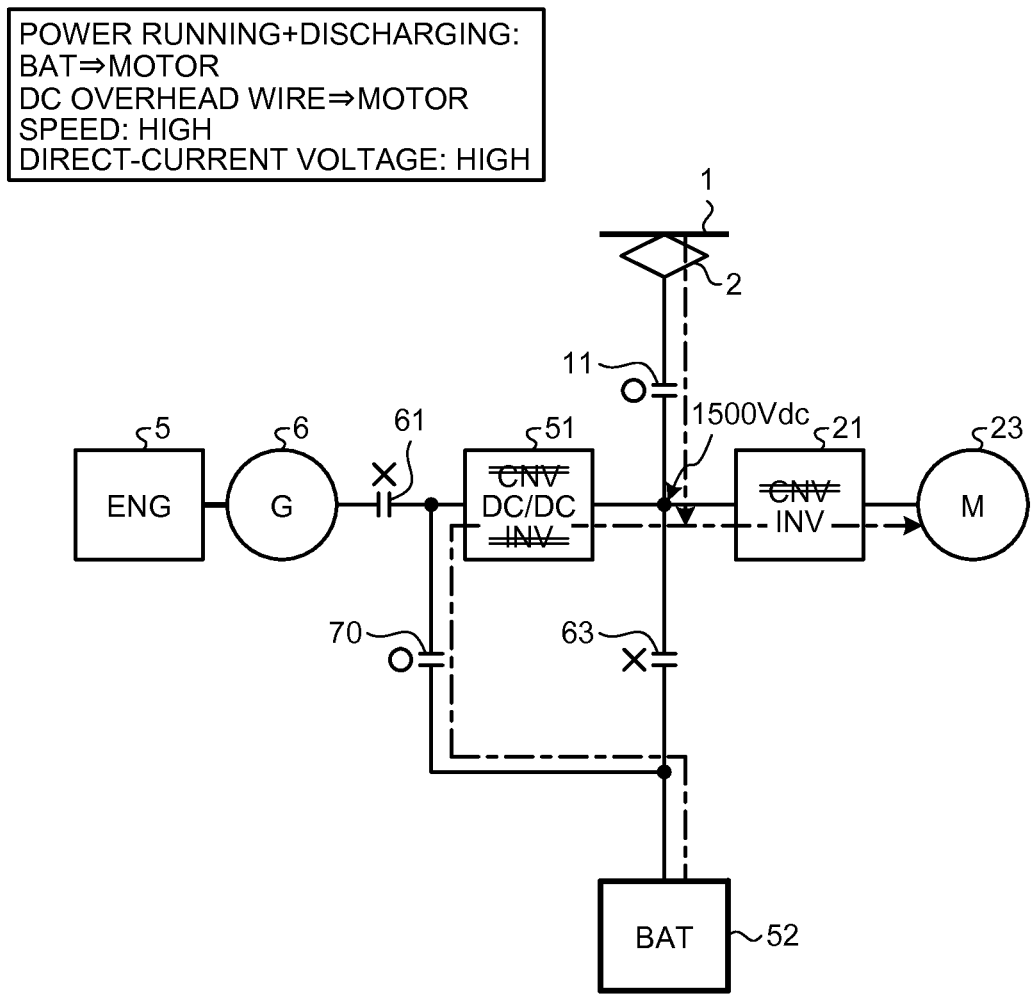
FIG. 18 is a diagram of an operation in driving the motor using both of the electric power of the DC overhead wire and the stored power of the power storage device.

FIG. 18 is a diagram of an operation in driving the motor 23 using both of the electric power of the DC overhead wire 1 and the stored power of the power storage device 52. As shown in the figure, when the motor 23 is driven using both of the electric power of the DC overhead wire 1 and the stored power of the power storage device 52, the DC pantograph 2 is lifted, the first circuit breaker 11 is controlled to be turned on, the third contactor 61 is controlled to be turned off, the first contactor 63 is controlled to be turned off, and the second contactor 70 is controlled to be turned on. Under the control, the second power converter 51 receives the stored power of the power storage device 52 to operate as the AC/DC converter. The first power converter 21 receives the output power of the second power converter 51 and the overhead wire power to operate as the DC/AC converter and drives the motor 23. Note that, in the control, the second power converter 51 is controlled such that the voltage of the direct-current common section changes to the high voltage (near 1500 Vdc) adjusted to the overhead wire voltage.

(b-6: Power Running+Charging)

Figure 19:
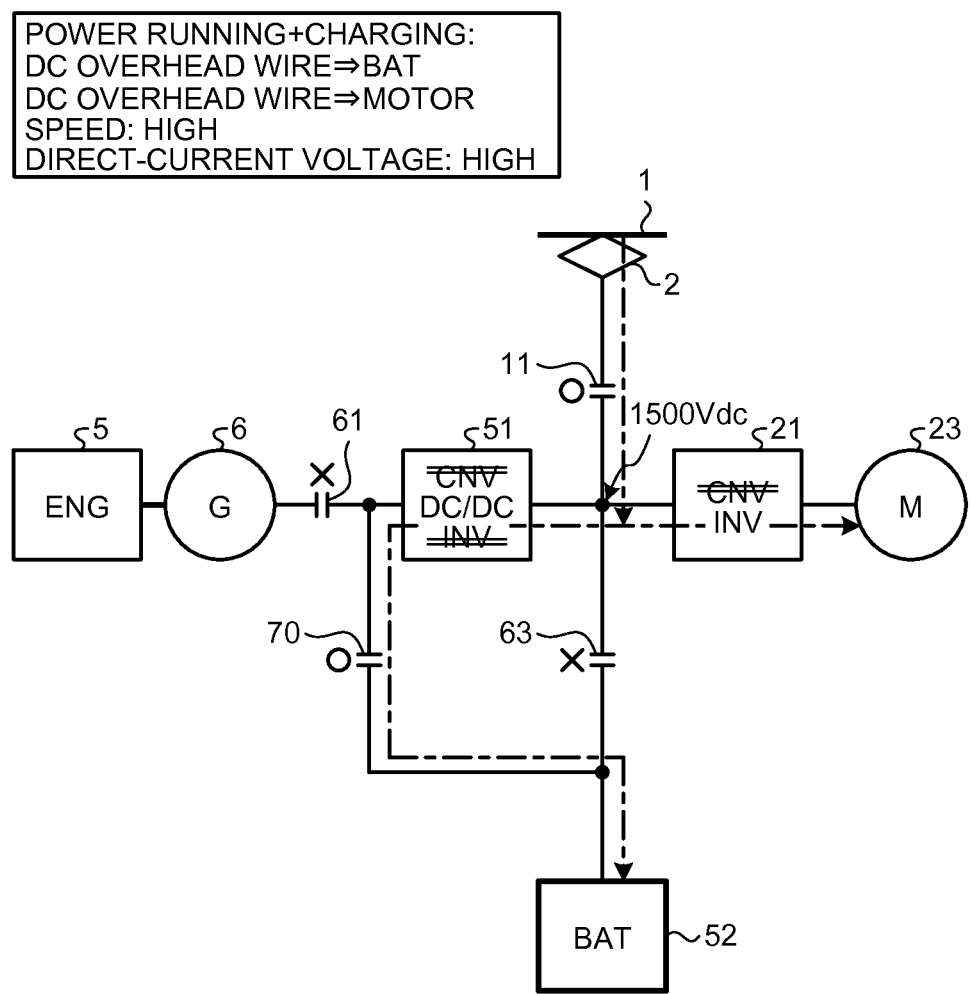
FIG. 19 is a diagram of an operation in using the electric power of the DC overhead wire as driving power for the motor and charged power in the power storage device.

FIG. 19 is a diagram of an operation in using the electric power of the DC overhead wire 1 as the driving power for the motor 23 and the charged power in the power storage device 52. As shown in the figure, when the overhead wire power is used as the driving power for the motor 23 and the charged power in the power storage device 52, the DC pantograph 2 is lifted, the first circuit breaker 11 is controlled to be turned on, the third contactor 61 is controlled to be turned off, the first contactor 63 is controlled to be turned off, and the second contactor 70 is controlled to be turned on. Under the control, the first power converter 21 receives the overhead wire power to operate as the DC/AC converter and drives the motor 23. The second power converter 51 receives a part of the overhead wire power to operate as the DC/DC converter and charges the power storage device 52.

(b-7: Regeneration)

Figure 20:
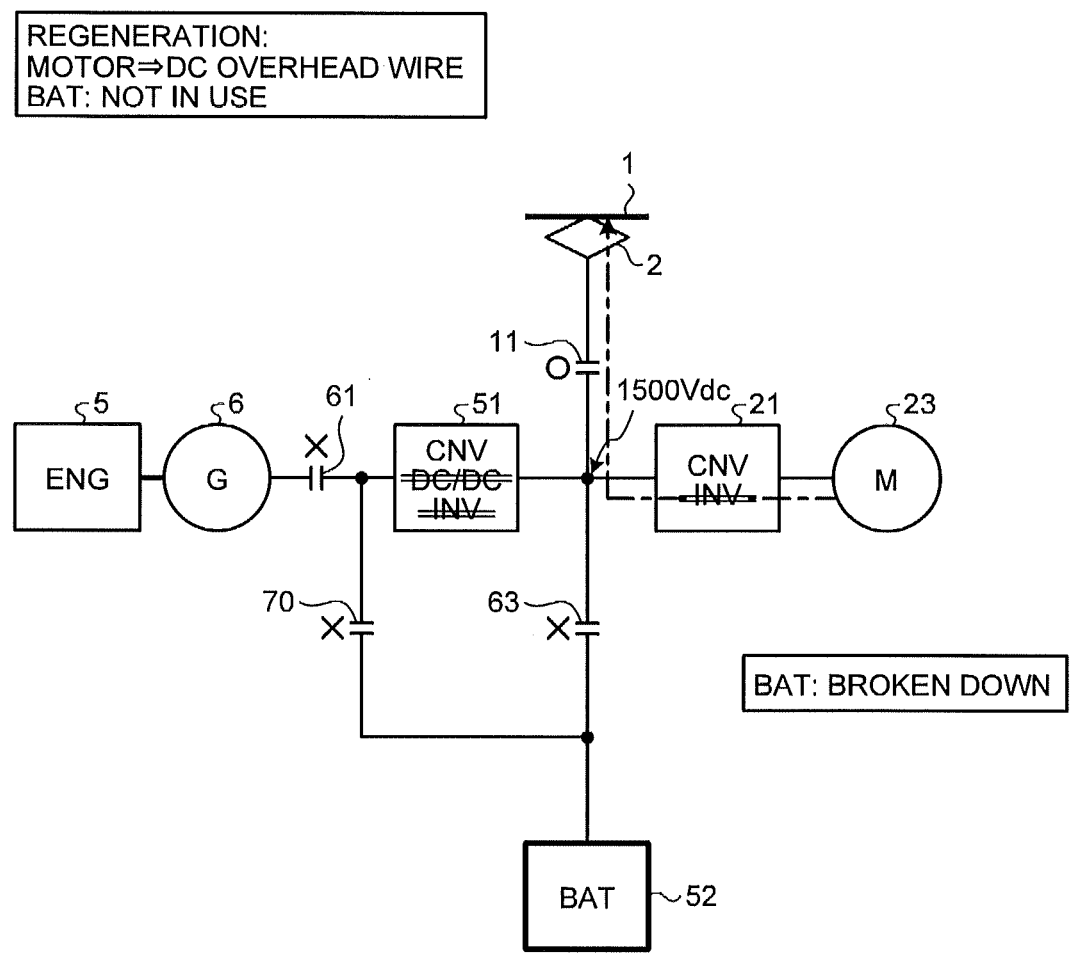
FIG. 20 is a diagram of an operation in returning the regenerative power of the motor to the DC overhead wire.

FIG. 20 is a diagram of an operation in returning the regenerative power of the motor 23 to the DC overhead wire 1. As shown in the figure, when the regenerative power of the motor 23 is returned to the DC overhead wire 1, the DC pantograph 2 is lifted, the first circuit breaker 11 is controlled to be turned on, the third contactor 61 is controlled to be turned off, the first contactor 63 is controlled to be turned off, and the second contactor 70 is controlled to be turned off. Under the control, the first power converter 21 receives the regenerative power of the motor 23 to operate as the AC/DC converter and returns the regenerative power to the DC overhead wire 1. Note that, in the control, to return the regenerative power to the DC overhead wire 1, the voltage of the direct-current common section is controlled to a high voltage (near 1500 Vdc or a predetermined voltage equal to or higher than 1500 Vdc).

(b-8: Regeneration+Engine Brake)

Figure 21:
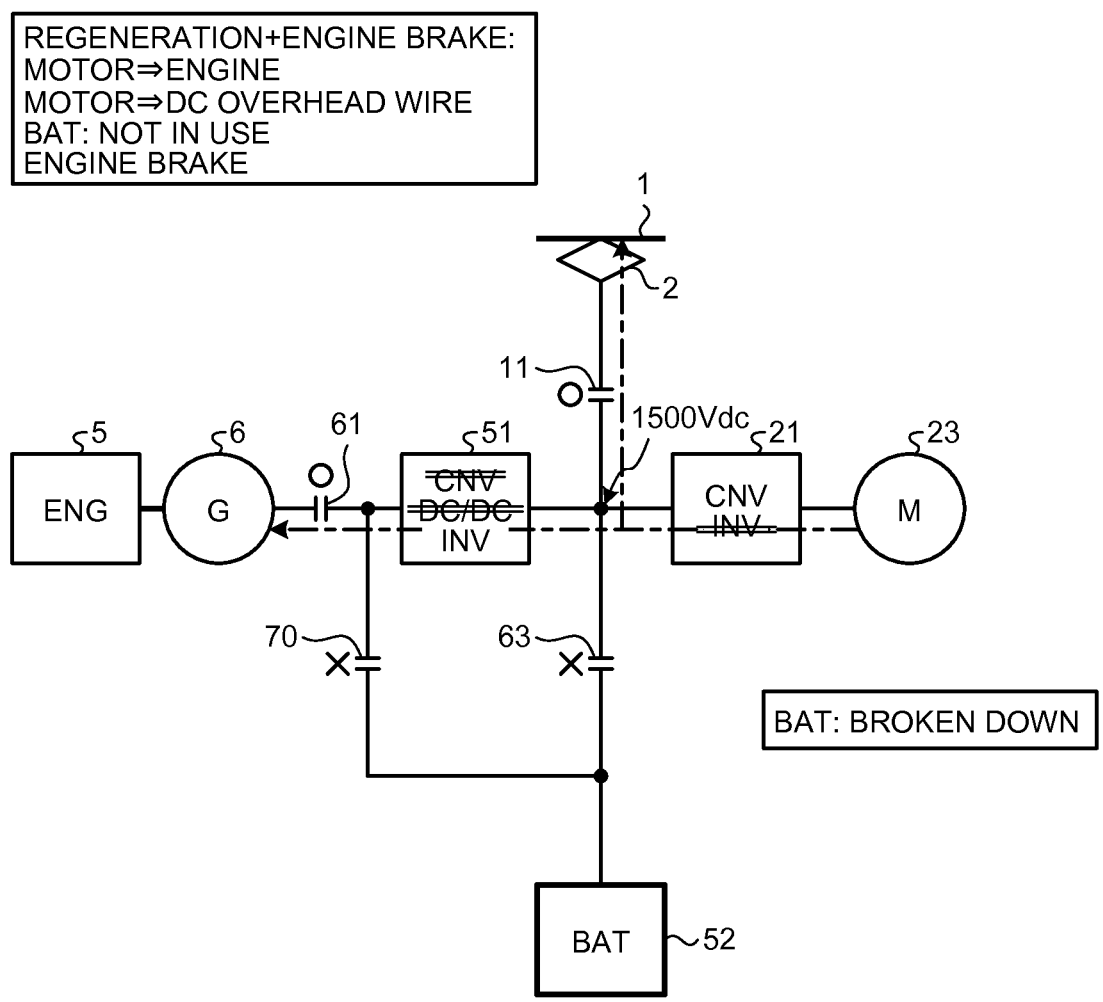
FIG. 21 is a diagram of an operation in using the regenerative power of the motor as overhead wire power and the engine brake.

FIG. 21 is a diagram of an operation in using the regenerative power of the motor 23 as the overhead wire power and the engine brake. As shown in the figure, when the regenerative power of the motor 23 is used as the overhead wire power and the engine brake, the DC pantograph 2 is lifted, the first circuit breaker 11 is controlled to be turned on, the third contactor 61 is controlled to be turned on, the first contactor 63 is controlled to be turned off, and the second contactor 70 is controlled to be turned off. Under the control, the first power converter 21 receives the regenerative power of the motor 23 to operate as the AC/DC converter and returns the regenerative power to the DC overhead wire 1. The second power converter 51 operates as the DC/AC converter, drives the generator 6 using the excess power supplied from the first power converter 21, and applies the engine brake. Note that, in the control, the regenerative power is returned to the DC overhead wire 1. Therefore, the voltage of the direct-current common section is controlled to the high voltage (near 1500 Vdc or the predetermined voltage equal to or higher than 1500 Vdc).

(b-9: Regeneration+Charging)

Figure 22:
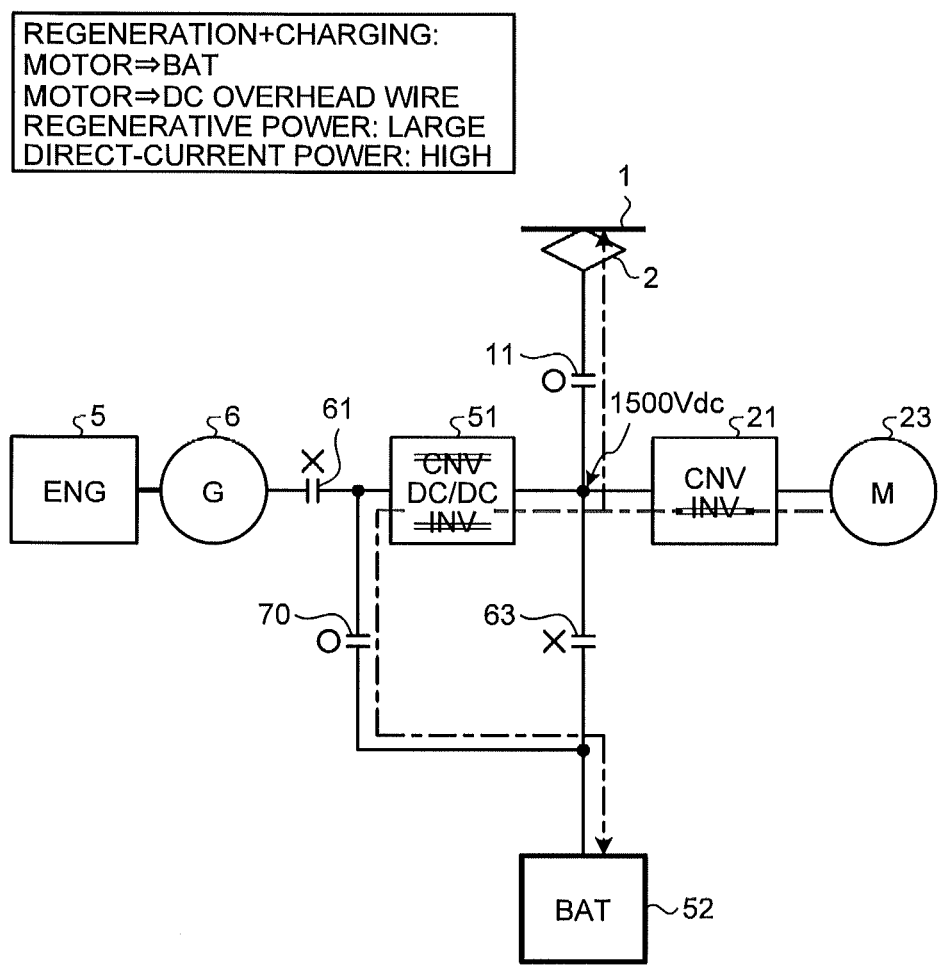
FIG. 22 is a diagram of an operation in using the regenerative power of the motor as the overhead wire power and the charged power.

FIG. 22 is a diagram of operation in using the regenerative power of the motor 23 as the overhead wire power and the charged power. As shown in the figure, when the regenerative power of the motor 23 is used as the overhead wire power and the charged power, the DC pantograph 2 is lifted, the first circuit breaker 11 is controlled to be turned on, the third contactor 61 is controlled to be turned off, the first contactor 63 is controlled to be turned off, and the second contactor 70 is controlled to be turned on. Under the control, the first power converter 21 receives the regenerative power of the motor 23 to operate as the AC/DC converter and returns the regenerative power to the DC overhead wire 1. The second power converter 51 receives a part of the regenerative power to operate as the DC/DC converter and charges the power storage device 52. Note that, in the control, the regenerative power is returned to the DC overhead wire 1. Therefore, the voltage of the direct-current common section is controlled to the high voltage (near 1500 Vdc or the predetermined voltage equal to or higher than 1500 Vdc).

(b10: Charging/Discharging)

Figure 23:
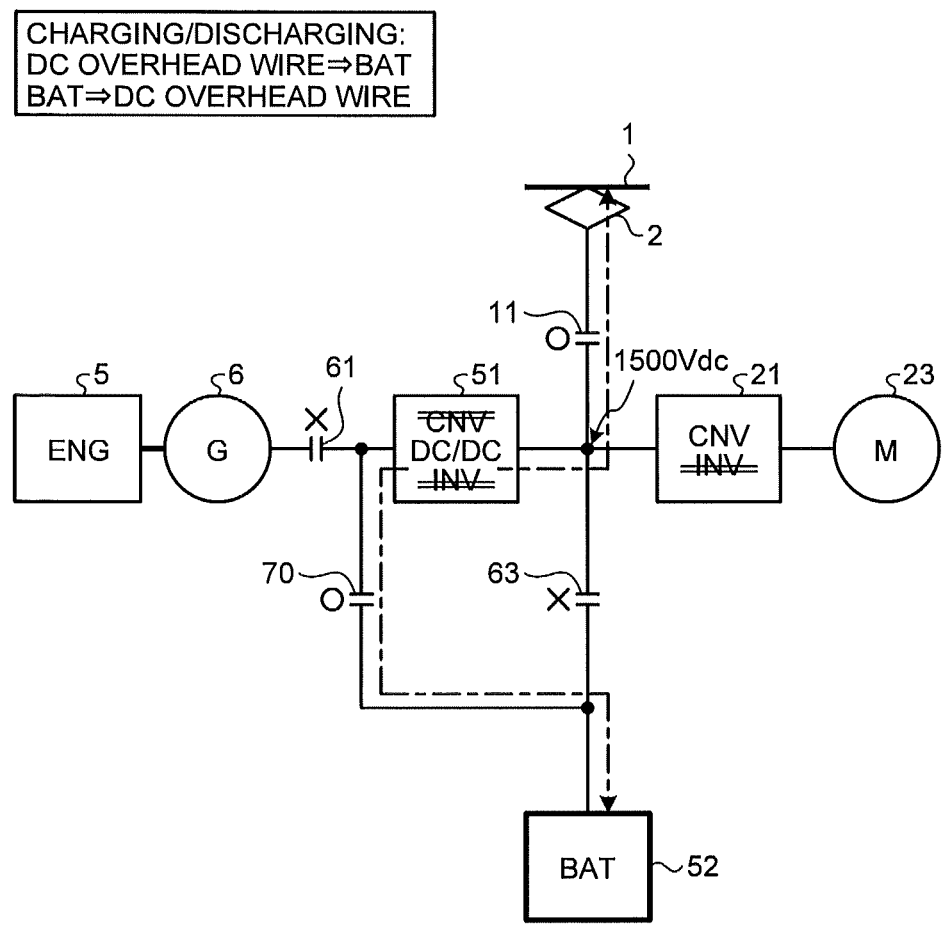
FIG. 23 is a diagram in performing charging or discharging between the DC overhead wire and the power storage device.

FIG. 23 is a diagram of an operation in performing charging or discharging between the DC overhead wire 1 and the power storage device 52. As shown in the figure, when charging or discharging is performed between the DC overhead wire 1 and the power storage device 52, the DC pantograph 2 is lifted, the first circuit breaker 11 is controlled to be turned on, the third contactor 61 is controlled to be turned off, the first contactor 63 is controlled to be turned off, and the second contactor 70 is controlled to be turned on. Under the control, when charging in the power storage device 52 is performed, the second power converter 51 operates as the DC/DC converter and steps down the overhead wire voltage (near 1500 Vdc) to a predetermined low voltage to charge the power storage device 52. On the other hand, when discharging is performed from the power storage device 52, it is performed such that the charged voltage (near 600 Vdc) is stepped up to the overhead wire voltage (near 1500 Vdc).

FIG. 24 is a diagram of a list in a table format of the operations shown in FIG. 14 to FIG. 23. Not only operation states or control states of the sections shown in the figures but also control states of the sections corresponding to the diagram of FIG. 1 are shown. Meanings of signs and the like are as explained with reference to FIG. 13. Detailed explanation of the meanings of the signs and the like is omitted. Contents shown in FIG. 24 are also as explained above. Detailed explanation of the contents is omitted.

As explained above, with the propulsion control apparatus in the first embodiment, according to an input form of electric power, the first power converter 21 is caused to operate as the DC/AC converter or the AC/DC converter and the second power converter 51 is caused to operate as the DC/AC converter, the AC/DC converter, or the DC/DC converter. The charging in the power storage device 52 is performed using the direct-current power supplied from the direct-current common section 90 or the first input and output end side not connected to the direct-current common section 90. The discharging from the power storage device 52 is performed through the direct-current common section 90 or the first input and output end. Consequently, it is unnecessary to provide a third power converter. Therefore, even when the conventional hybrid vehicle is enabled to be used even with the overhead wire power, it is possible to realize a configuration that does not cause an increase of power converters.

With the propulsion control apparatus in the first embodiment, it is possible to freely adjust the voltage of the direct-current common section 90 to a desired voltage including a high voltage or a low voltage according to an input form of supplied electric power. That is, it is possible to maintain the voltage of the direct-current common section 90 at the high voltage except in a part of input forms. Consequently, it is possible to increase chances of making most of the ability of the first power converter 21, and is also possible to efficiently performing the charging in the power storage device 52.

Second Embodiment

Figure 25:
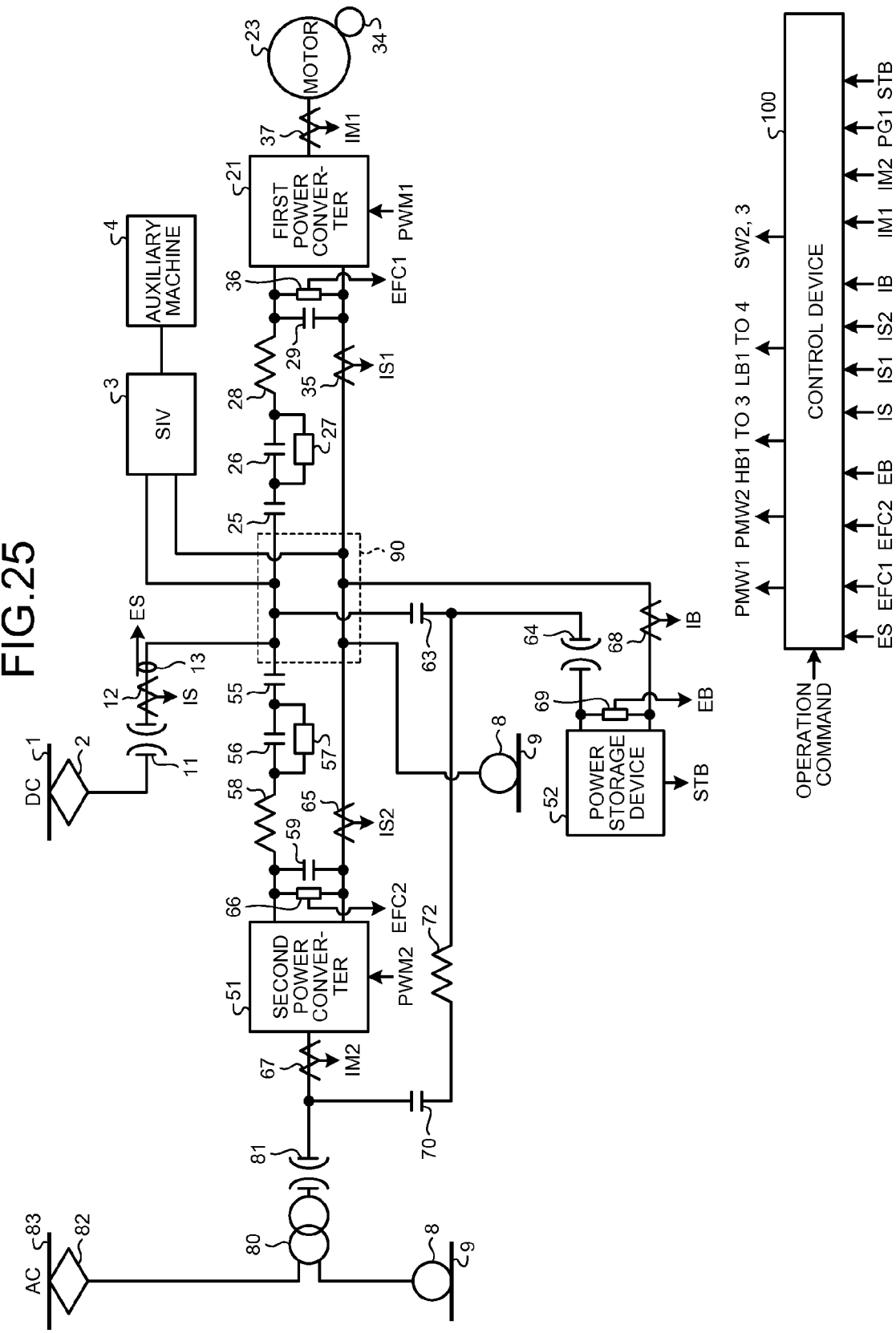
FIG. 25 is a diagram of a configuration example of a hybrid vehicle system including a propulsion control apparatus according to a second embodiment.

FIG. 25 is a diagram of a configuration example of a hybrid vehicle system including a propulsion control apparatus according to a second embodiment of the present invention.

The hybrid vehicle system in the first embodiment includes the two direct-current power supply sources, i.e., the DC overhead wire and the power storage device and the one alternating-current power supply source formed by the engine and the generator. On the other hand, in the hybrid vehicle system in the second embodiment, instead of the configuration including the engine 5 and the generator 6, a configuration is adopted in which alternating-current power from a single-phase alternating-current overhead wire (hereinafter referred to as "AC overhead wire") 83 is received via an AC pantograph 82 and the received alternating-current power is supplied (applied) to the second power converter 51 via a transformer 80 and a third circuit breaker 81. The other components are the same as or equivalent to the components shown in FIG. 1. The components are denoted by the same reference numerals and signs and detailed explanation of the components is omitted.

Figure 26:
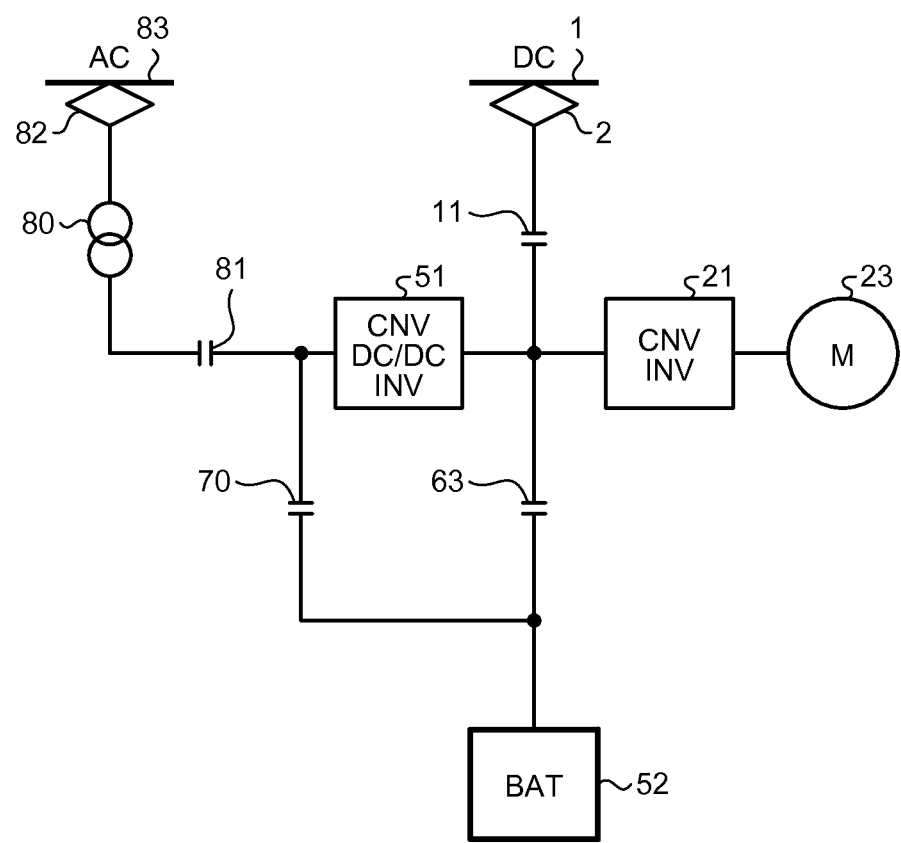
FIG. 26 is a schematic configuration diagram for explaining operations corresponding to respective modes of the propulsion control apparatus according to the second embodiment.

Operations by respective modes in the propulsion control apparatus in the second embodiment are explained. FIG. 26 is a simplified configuration diagram for explaining the operations corresponding to the modes of the propulsion control apparatus according to the second embodiment. Note that a way of writing in FIG. 26 is the same as the way of writing shown in FIG. 2. As in FIG. 2, only main components deeply related to the operations by the modes are shown.

(c-1: Power Running)

Figure 27:
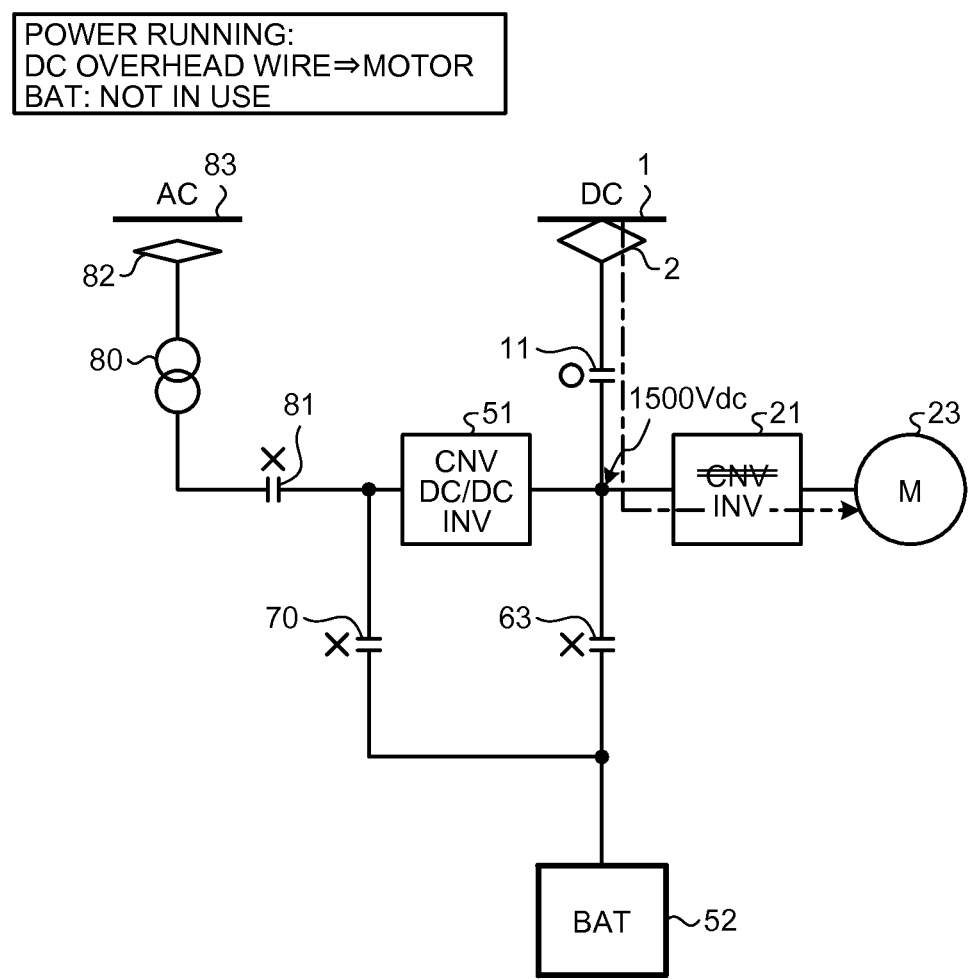
FIG. 27 is a diagram of an operation in driving a motor using electric power of a DC overhead wire.

FIG. 27 is a diagram of an operation in driving the motor 23 using electric power of the DC overhead wire 1. As shown in the figure, when the motor 23 is driven using the electric power of the DC overhead wire 1, the DC pantograph 2 is lifted, the AC pantograph 82 is lowered, the first circuit breaker 11 is controlled to be turned on, the third circuit breaker 81 is controlled to be turned off, the first contactor 63 is controlled to be turned off, and the third contactor 70 is also controlled to be turned off. Under the control, the first power converter 21 operates as the DC/AC converter and drives the motor 23.

(c-2: Power Running)

Figure 28:
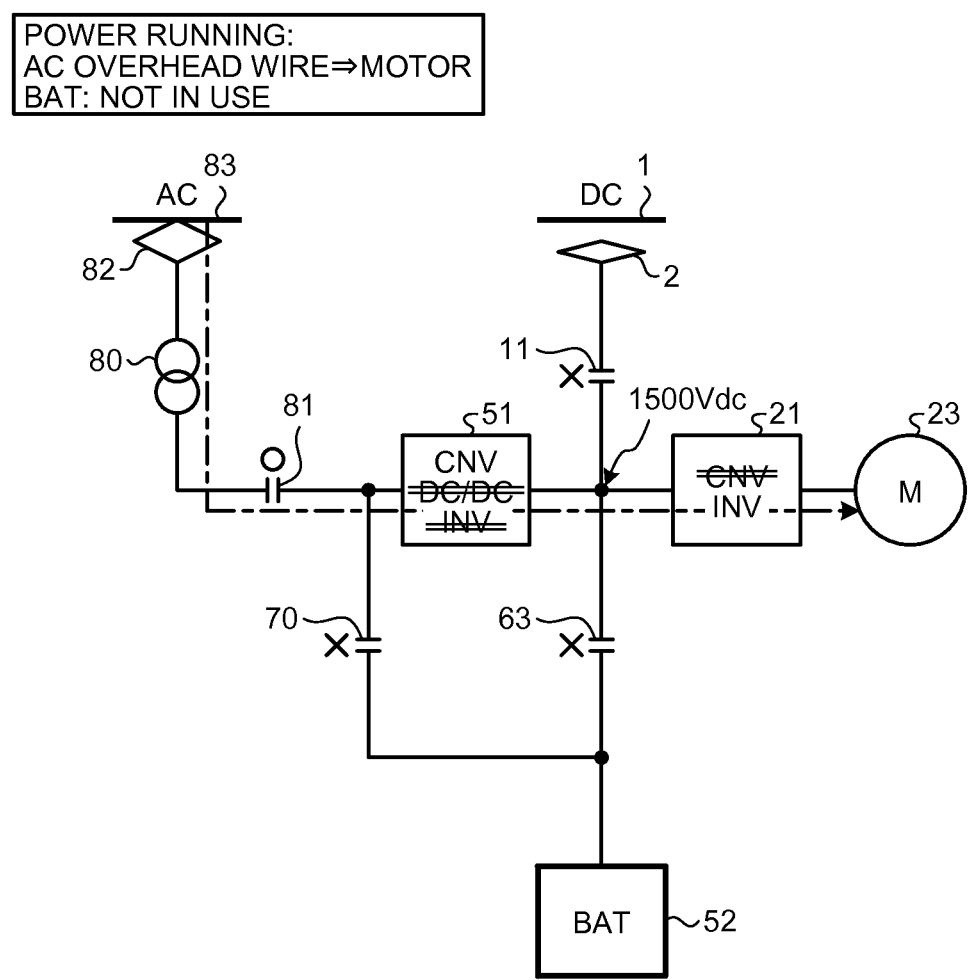
FIG. 28 is a diagram of an operation in driving the motor using electric power of an AC overhead wire.

FIG. 28 is a diagram of an operation in driving the motor 23 using electric power of the AC overhead wire 83. As shown in the figure, when the motor 23 is driven using the electric power of the AC overhead wire 83, the DC pantograph 2 is lowered, the AC pantograph 82 is lifted, the first circuit breaker 11 is controlled to be turned off, the third circuit breaker 81 is controlled to be turned on, the first contactor 63 is controlled to be turned off, and the third contactor 70 is also controlled to be turned off. Under the control, the second power converter 51 operates as the AC/DC converter and converts the AC overhead wire power into direct-current power. The first power converter 21 receives the converted electric power of the second power converter 51 to operate as the DC/AC converter and drives the motor 23. Note that, in the control, the second power converter 51 is controlled such that the voltage of the direct-current common section changes to a high voltage (near 1500 Vdc) adjusted to a nominal voltage of the DC overhead wire.

(c-3: Power Running+Discharging)

Figure 29:
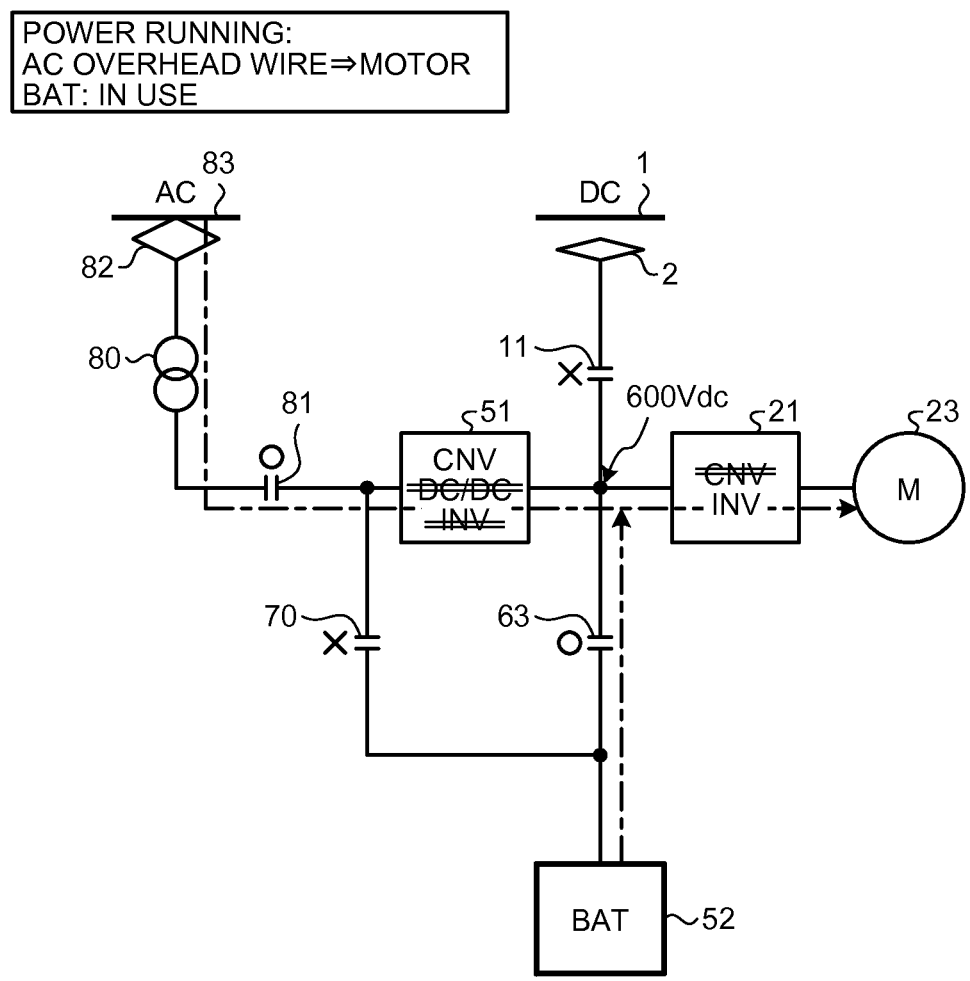
FIG. 29 is a diagram of an operation in driving the motor using both of the electric power of the AC overhead wire and stored power of a power storage device.

FIG. 29 is a diagram of an operation in driving the motor 23 using both of the electric power of the AC overhead wire 83 and stored power of the power storage device 52. As shown in the figure, when the motor 23 is driven using both of the electric power of the AC overhead wire 83 and the stored power of the power storage device 52, the DC pantograph 2 is lowered, the AC pantograph 82 is lifted, the first circuit breaker 11 is controlled to be turned off, the third circuit breaker 81 is controlled to be turned on, the first contactor 63 is controlled to be turned on, and the second contactor 70 is controlled to be turned off. Under the control, the second power converter 51 receives the AC overhead wire power to operate as the AC/DC converter. The first power converter 21 receives output power of the second power converter 51 and the stored power of the power storage device 52 to operate as the DC/AC converter and drives the motor 23. Note that, in the control, because the power storage device 52 is connected to the direct-current common section, the second power converter 51 is controlled such that the voltage of the direct-current common section changes to a low voltage (near 600 Vdc).

(c-4: Power Running+Discharging)

Figure 30:
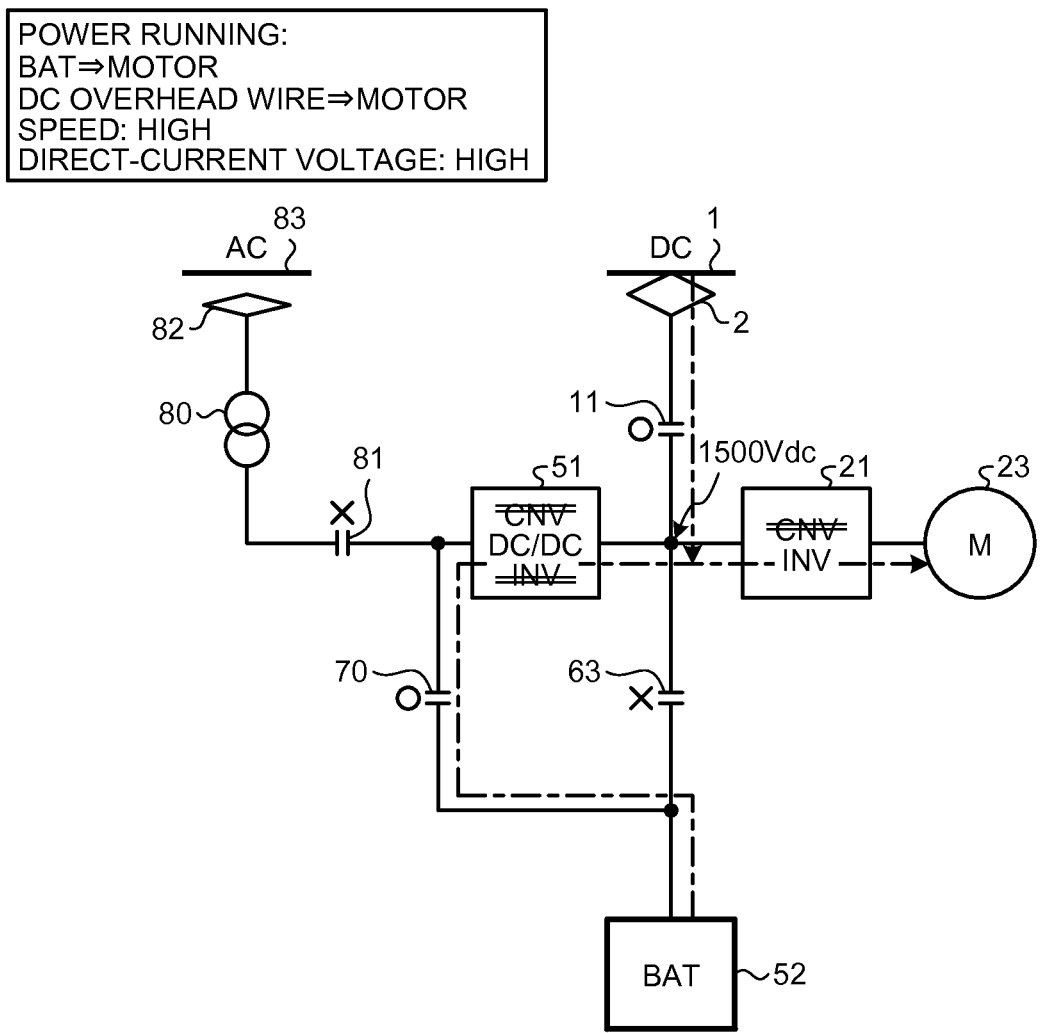
FIG. 30 is a diagram of an operation in driving the motor using both of the electric power of the DC overhead wire and the stored power of the power storage device.

FIG. 30 is a diagram of an operation in driving the motor 23 using both of the electric power of the DC overhead wire 1 and the stored power of the power storage device 52. As shown in the figure, when the motor 23 is driven using both of the electric power of the DC overhead wire 1 and the stored power of the power storage device 52, the DC pantograph 2 is lifted, the AC pantograph 82 is lowered, the first circuit breaker 11 is controlled to be turned on, the third circuit breaker 81 is controlled to be turned off, the first contactor 63 is controlled to be turned off, and the second contactor 70 is controlled to be turned on. Under the control, the second power converter 51 receives the stored power of the power storage device 52 to operate as the DC/AC converter. The first power converter 21 receives output power of the second power converter 51 and the DC overhead wire power to operate as the DC/AC converter and drives the motor 23. Note that, in the control, the second power converter 51 is controlled such that the voltage of the direct-current common section changes to the high voltage (near 1500 Vdc) adjusted to the DC overhead wire voltage.

(c-5: Regeneration)

Figure 31:
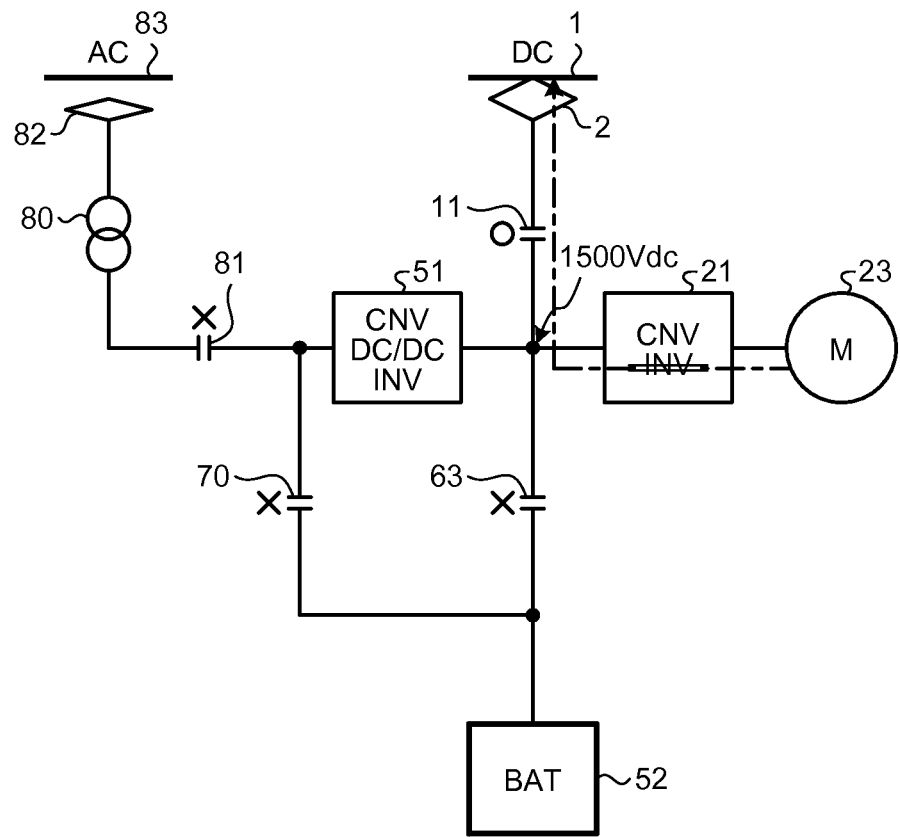
FIG. 31 is a diagram of an operation in returning regenerative power of the motor to the DC overhead wire.

FIG. 31 is a diagram of an operation in returning regenerative power of the motor 23 to the DC overhead wire 1. As shown in the figure, when the regenerative power of the motor 23 is returned to the DC overhead wire 1, the DC pantograph 2 is lifted, the AC pantograph 82 is lowered, the first circuit breaker 11 is controlled to be turned on, the third circuit breaker 81 is controlled to be turned off, the first contactor 63 is controlled to be turned off, and the second contactor 70 is also controlled to be turned off. Under the control, the first power converter 21 receives the regenerative power of the motor 23 to operate as the AC/DC converter and returns the regenerative power to the DC overhead wire 1. Note that, in the control, to return the regenerative power to the DC overhead wire 1, the voltage of the direct-current common section is controlled to a high voltage (near 1500 Vdc or a predetermined voltage equal to or higher than 1500 Vdc).

(c-6: Regeneration)

Figure 32:
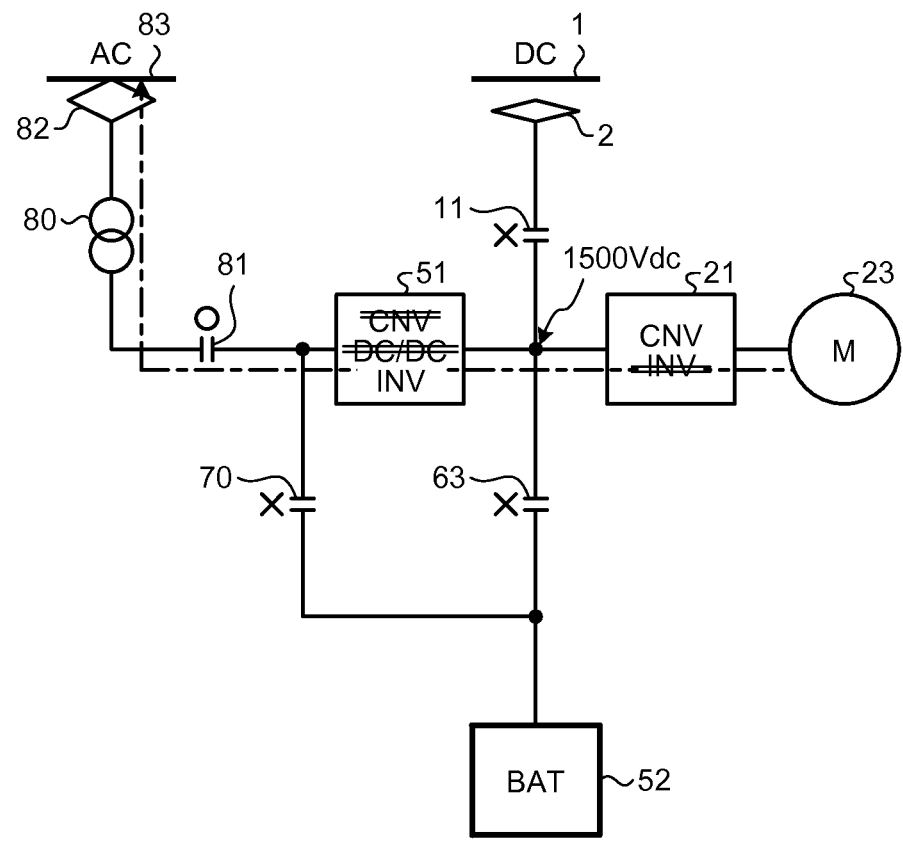
FIG. 32 is a diagram of an operation in returning the regenerative power of the motor to the AC overhead wire.

FIG. 32 is a diagram of an operation in returning the regenerative power of the motor 23 to the AC overhead wire 83. As shown in the figure, when the regenerative power of the motor 23 is returned to the AC overhead wire 83, the DC pantograph 2 is lowered, the AC pantograph 82 is lifted, the first circuit breaker 11 is controlled to be turned off, the third circuit breaker 81 is controlled to be turned on, the first contactor 63 is controlled to be turned off, and the second contactor 70 is also controlled to be turned off. Under the control, the first power converter 21 receives the regenerative power of the motor 23 to operate as the AC/DC converter and converts the regenerative power into direct-current power. The second power converter 51 receives the output power of the first power converter 21 to operate as the DC/AC converter and returns converted alternating-current power to the AC overhead wire 83. Note that, in the control, in order to efficiently return the regenerative power to the AC overhead wire 83, the voltage of the direct-current common section is controlled to the high voltage (near 1500 Vdc or the predetermined voltage equal to or higher than 1500 Vdc).

(c-7: Regeneration+Charging)

Figure 33:
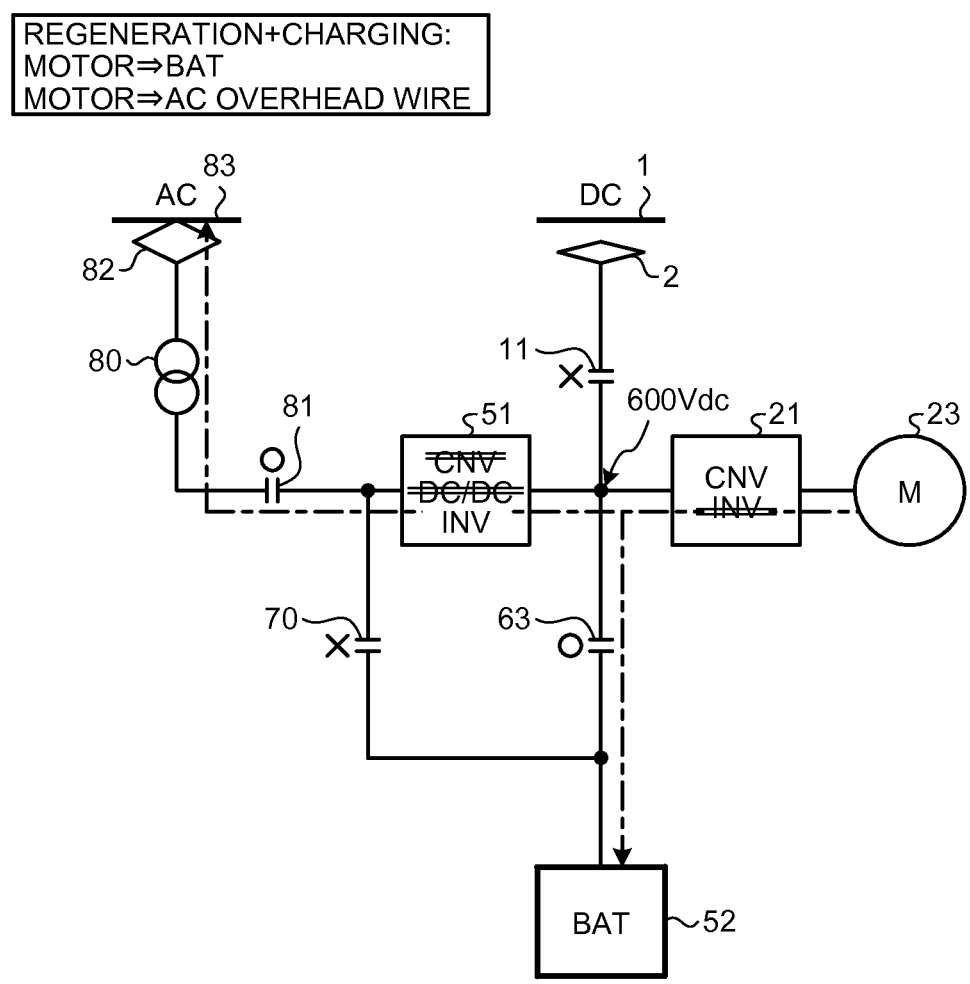
FIG. 33 is a diagram of an operation in using the regenerative power of the motor as electric power of the AC overhead wire and charged power.

FIG. 33 is a diagram of operation in using the regenerative power of the motor 23 as the AC overhead wire power and the charged power. As shown in the figure, when the regenerative power of the motor 23 is used as the AC overhead wire power and the charged power, the DC pantograph 2 is lowered, the AC pantograph 82 is lifted, the first circuit breaker 11 is controlled to be turned off, the third circuit breaker 81 is controlled to be turned on, the first contactor 63 is controlled to be turned on, and the second contactor 70 is controlled to be turned off. Under the control, the first power converter 21 receives the regenerative power of the motor 23 to operate as the AC/DC converter and charges the power storage device 52 using the regenerative power. The second power converter 51 operates as the DC/AC converter, converts excess power supplied from the first power converter 21 into alternating-current power, and returns the converted electric power to the AC overhead wire 83. Note that, in the control, because the power storage device 52 is connected to the direct-current common section, the voltage of the direct-current common section is controlled to the low voltage (near 600 Vdc).

(c-8: Regeneration+Charging)

Figure 34:
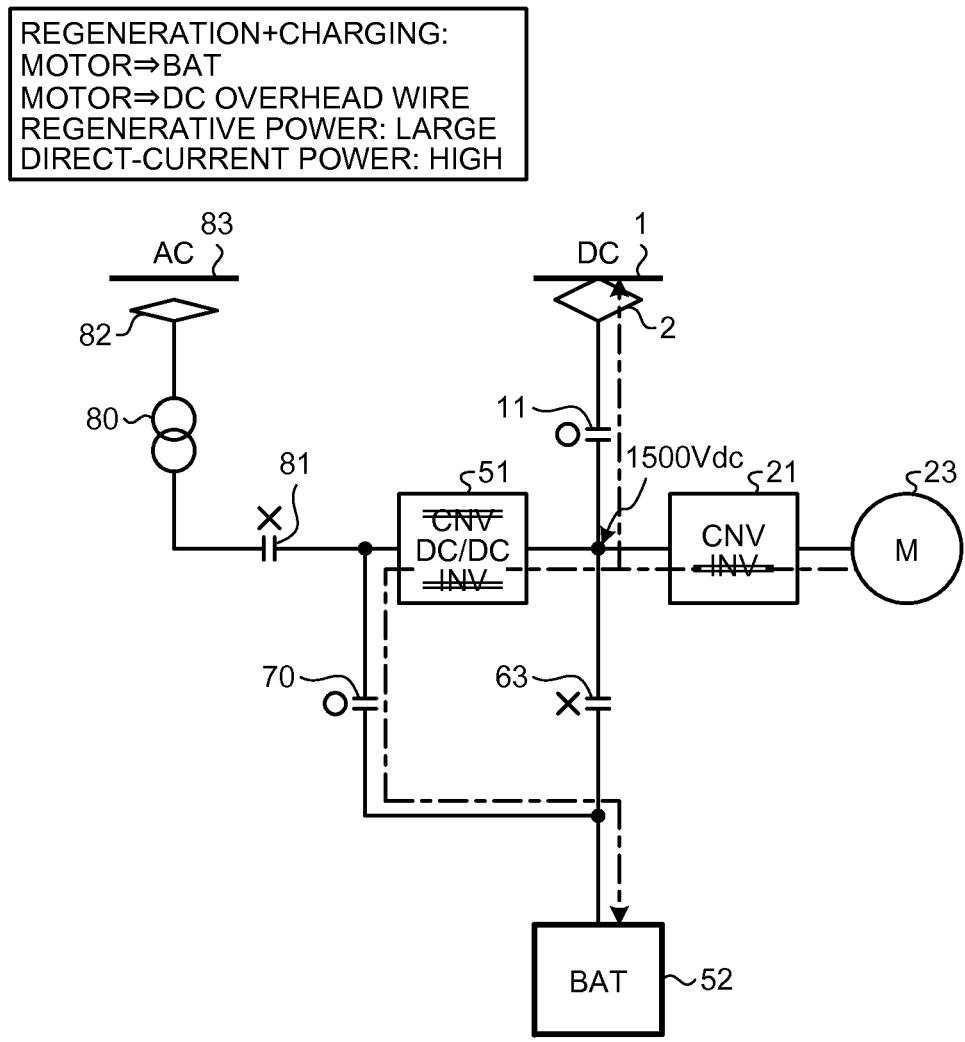
FIG. 34 is a diagram of an operation in using the regenerative power of the motor as the electric power of the DC overhead wire and the charged power.

FIG. 34 is a diagram of operation in using the regenerative power of the motor 23 as the DC overhead wire power and the charged power. As shown in the figure, when the regenerative power of the motor 23 is used as the DC overhead wire power and the charged power, the DC pantograph 2 is lifted, the AC pantograph 82 is lowered, the first circuit breaker 11 is controlled to be turned on, the third circuit breaker 81 is controlled to be turned off, the first contactor 63 is controlled to be turned off, and the second contactor 70 is controlled to be turned on. Under the control, the first power converter 21 receives the regenerative power of the motor 23 to operate as the AC/DC converter and returns the regenerative power to the DC overhead wire 1. The second power converter 51 receives a part of the regenerative power to operate as the DC/DC converter and charges the power storage device 52. Note that, in the control, to return the regenerative power to the DC overhead wire 1, the voltage of the direct-current common section is controlled to the high voltage (near 1500 Vdc or the predetermined voltage equal to or higher than 1500 Vdc).

(c-9: Charging/Discharging)

Figure 35:
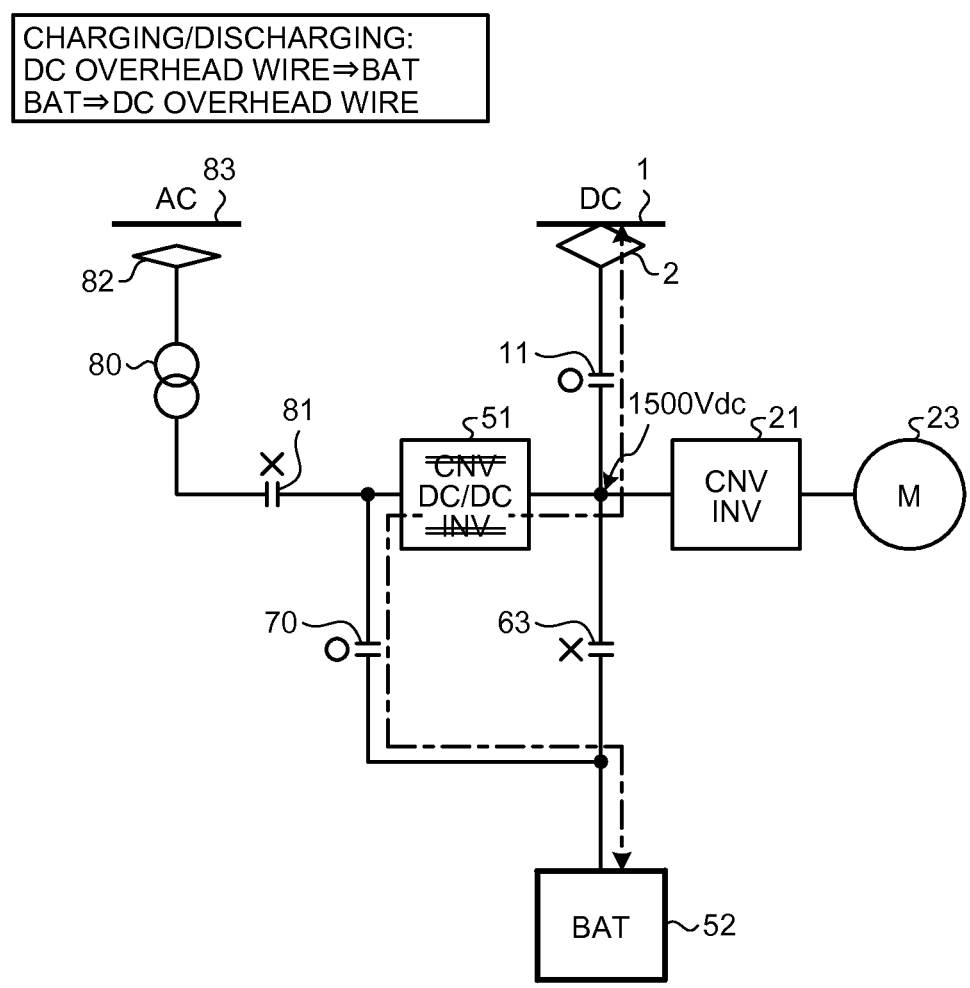
FIG. 35 is a diagram of an operation in performing charging or discharging between the DC overhead wire and the power storage device.

FIG. 35 is a diagram of an operation in performing charging or discharging between the DC overhead wire 1 and the power storage device 52. As shown in the figure, when charging or discharging is performed between the DC overhead wire 1 and the power storage device 52, the DC pantograph 2 is lifted, the AC pantograph 82 is lowered, the first circuit breaker 11 is controlled to be turned on, the third circuit breaker 81 is turned off, the first contactor 63 is controlled to be turned off, and the second contactor 70 is controlled to be turned on. Under the control, when charging in the power storage device 52 is performed, the second power converter 51 operates as the DC/DC converter and steps down the overhead wire voltage (near 1500 Vdc) to a predetermined low voltage to charge the power storage device 52. On the other hand, when discharging is performed from the power storage device 52, the second power converter 51 steps up the charged voltage (near 600 Vdc) to the overhead wire voltage (near 1500 Vdc) to discharge the power storage device 52.

(c-10: Charging/Discharging)

Figure 36:
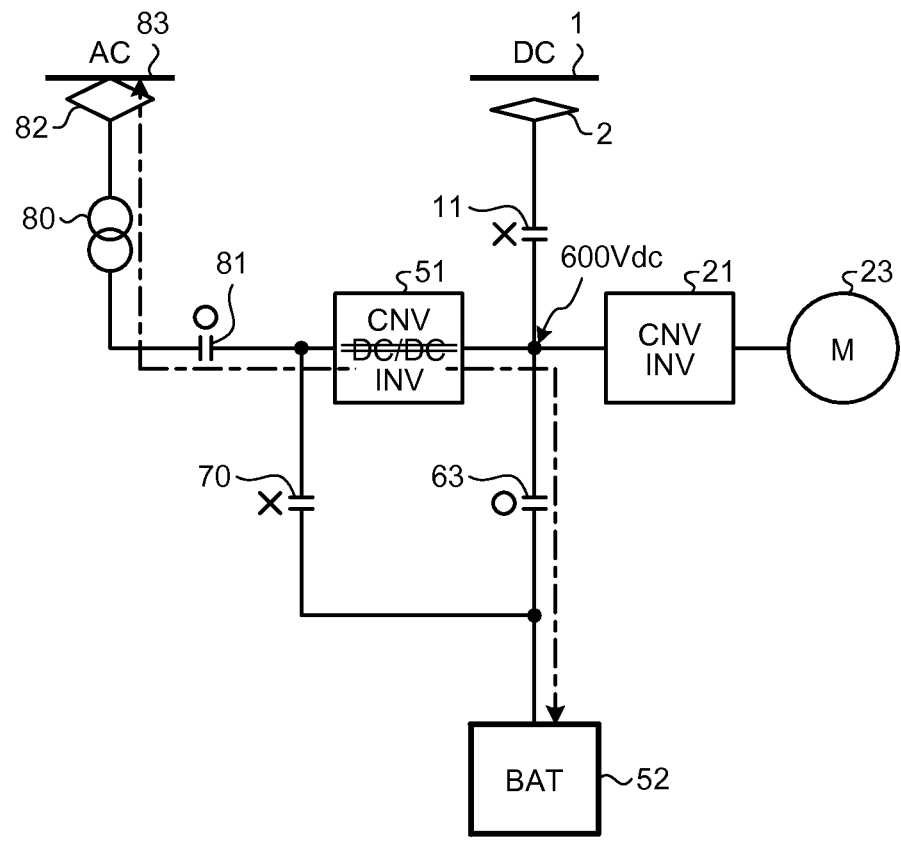
FIG. 36 is a diagram of an operation in performing charging or discharging between the AC overhead wire and the power storage device.

FIG. 36 is a diagram of an operation in performing charging or discharging between the AC overhead wire 83 and the power storage device 52. As shown in the figure, when charging or discharging is performed between the AC overhead wire 83 and the power storage device 52, the DC pantograph 2 is lowered, the AC pantograph 82 is lifted, the first circuit breaker 11 is controlled to be turned off, the third circuit breaker 81 is turned on, the first contactor 63 is controlled to be turned on, and the second contactor 70 is controlled to be turned off. Under the control, when charging in the power storage device 52 is performed, the second power converter 51 operates as the AC/DC converter and steps down the AC overhead wire voltage to the predetermined low voltage to charge the power storage device 52. On the other hand, when discharging is performed from the power storage device 52, the second power converter 51 steps up the voltage of the power storage device 52 to a predetermined alternating-current voltage to perform discharging to the AC overhead wire 83. Note that conversion of the voltage (the charged voltage; near 600 Vdc) of the power storage device 52 to the AC overhead wire voltage is performed by adjusting a step-up ratio of the second power converter 51 taking into account a winding ratio of the transformer 80.

(c-11: Power Interchange)

Figure 37:
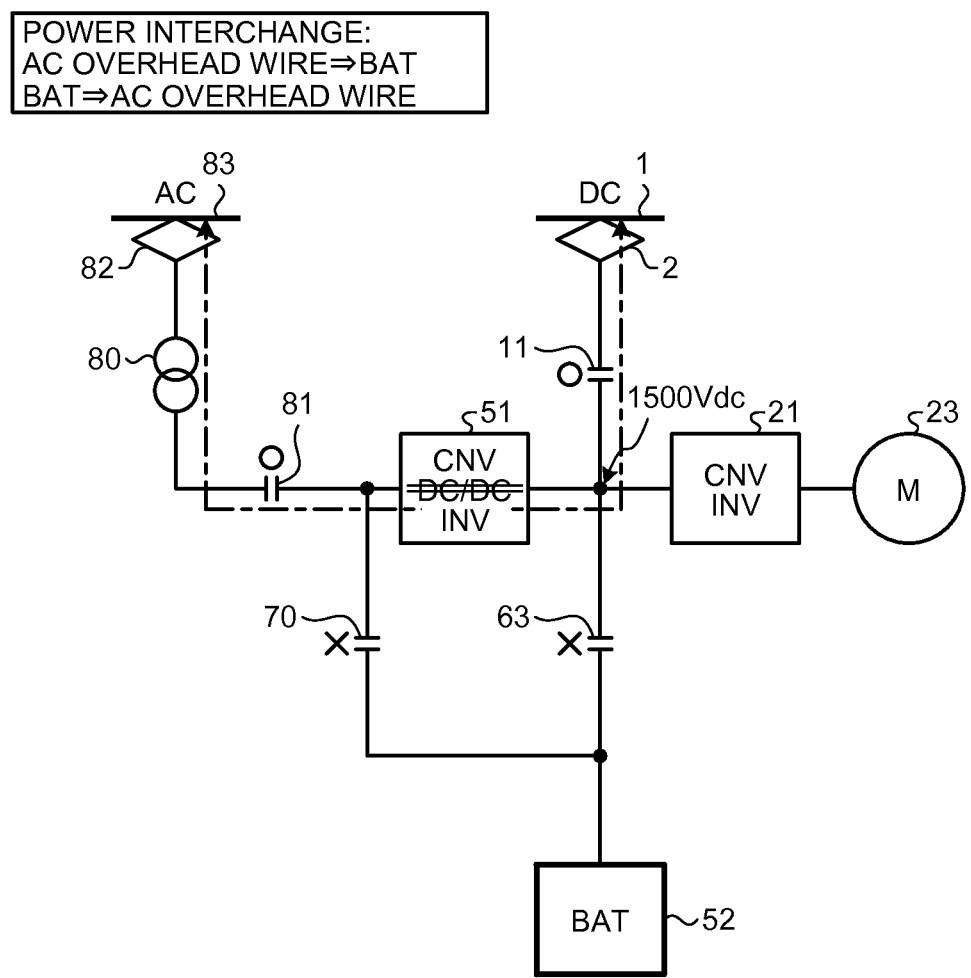
FIG. 37 is a diagram of an operation in performing a power interchange between the DC overhead wire and the AC overhead wire.

FIG. 37 is a diagram of an operation in performing power interchange between the DC overhead wire 1 and the AC overhead wire 83. As shown in the figure, when the power interchange is performed between the DC overhead wire 1 and the AC overhead wire 83, the DC pantograph 2 is lifted, the AC pantograph 82 is also lifted, the first circuit breaker 11 is controlled to be turned on, the third circuit breaker 81 is also controlled to be turned on, the first contactor 63 is controlled to be turned off, and the second contactor 70 is also controlled to be turned off. Under the control, when the power interchange is performed from the DC overhead wire 1 to the AC overhead wire 83, the second power converter 51 operates as the DC/AC converter, converts the DC overhead wire voltage to the predetermined AC overhead wire voltage, and supplies the predetermined AC overhead wire voltage to the AC overhead wire. On the other hand, when the power interchange is performed from the AC overhead wire 83 to the DC overhead wire 1, the second power converter 51 operates as the AC/DC converter, converts the AC overhead wire voltage to the predetermined DC overhead wire voltage, and supplies the predetermined DC overhead wire voltage to the DC overhead wire. Note that, in the control, because the DC overhead wire 1 is connected to the direct-current common section, the voltage of the direct-current common section is controlled to the high voltage (near 1500 Vdc).

(c-12: Power Running+Charging)

Figure 38:
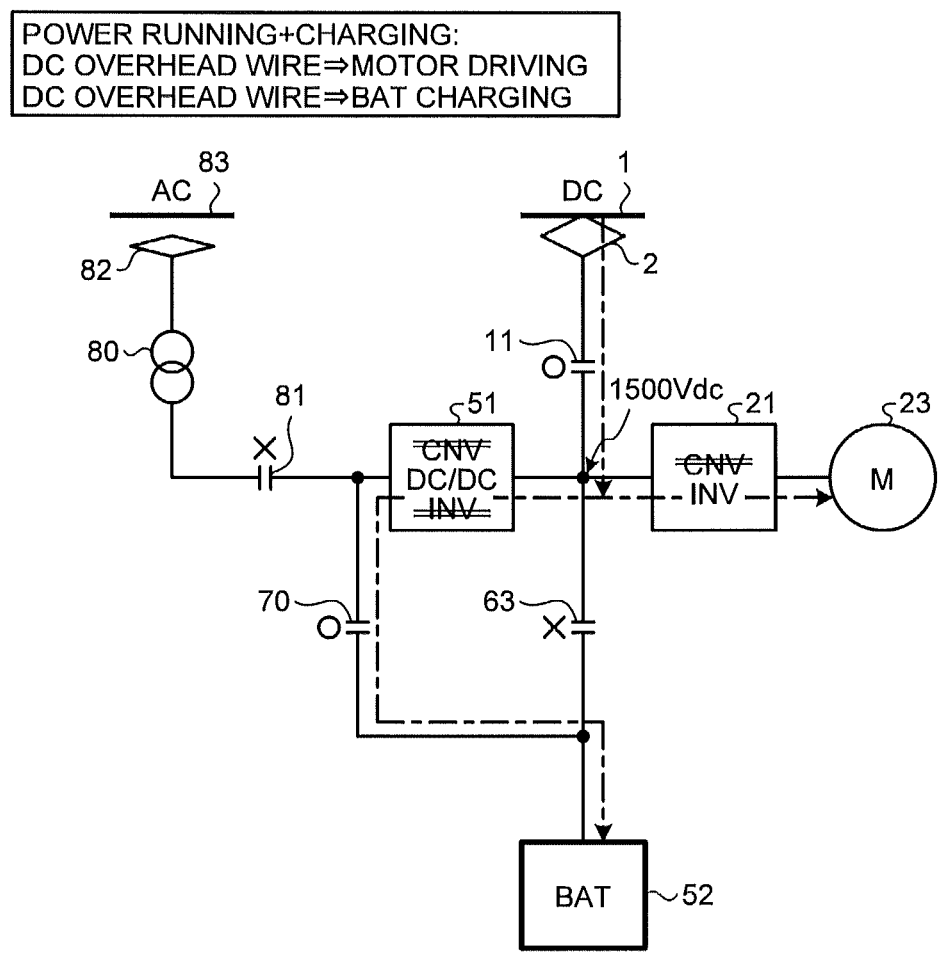
FIG. 38 is a diagram of an operation in using the electric power of the DC overhead wire as the driving power for the motor and the charged power in the power storage device.

FIG. 38 is a diagram of an operation in using the electric power of the DC overhead wire 1 as the driving power for the motor 23 and the charged power in the power storage device 52. As shown in the figure, when the DC overhead wire power is used as the driving power for the motor 23 and the charged power in the power storage device 52, the DC pantograph 2 is lifted, the AC pantograph 82 is lowered, the first circuit breaker 11 is controlled to be turned on, the third circuit breaker 81 is controlled to be turned off, the first contactor 63 is controlled to be turned off, and the second contactor 70 is controlled to be turned on. Under the control, the first power converter 21 receives the DC overhead wire power to operate as the DC/AC converter and drives the motor 23. The second power converter 51 receives a part of the DC overhead wire power to operate as the DC/DC converter and charges the power storage device 52.

FIG. 39 is a diagram of a list in a table format of the operations shown in FIG. 27 to FIG. 38. Not only operation states or control states of the sections shown in the figures but also control states of the sections corresponding to the diagram of FIG. 25 are shown. Meanings of signs and the like are as explained with reference to FIG. 13. Detailed explanation of the meanings of the signs and the like is omitted. Contents shown in FIG. 39 are also as explained above. Detailed explanation of the contents is omitted.

Figure 40:
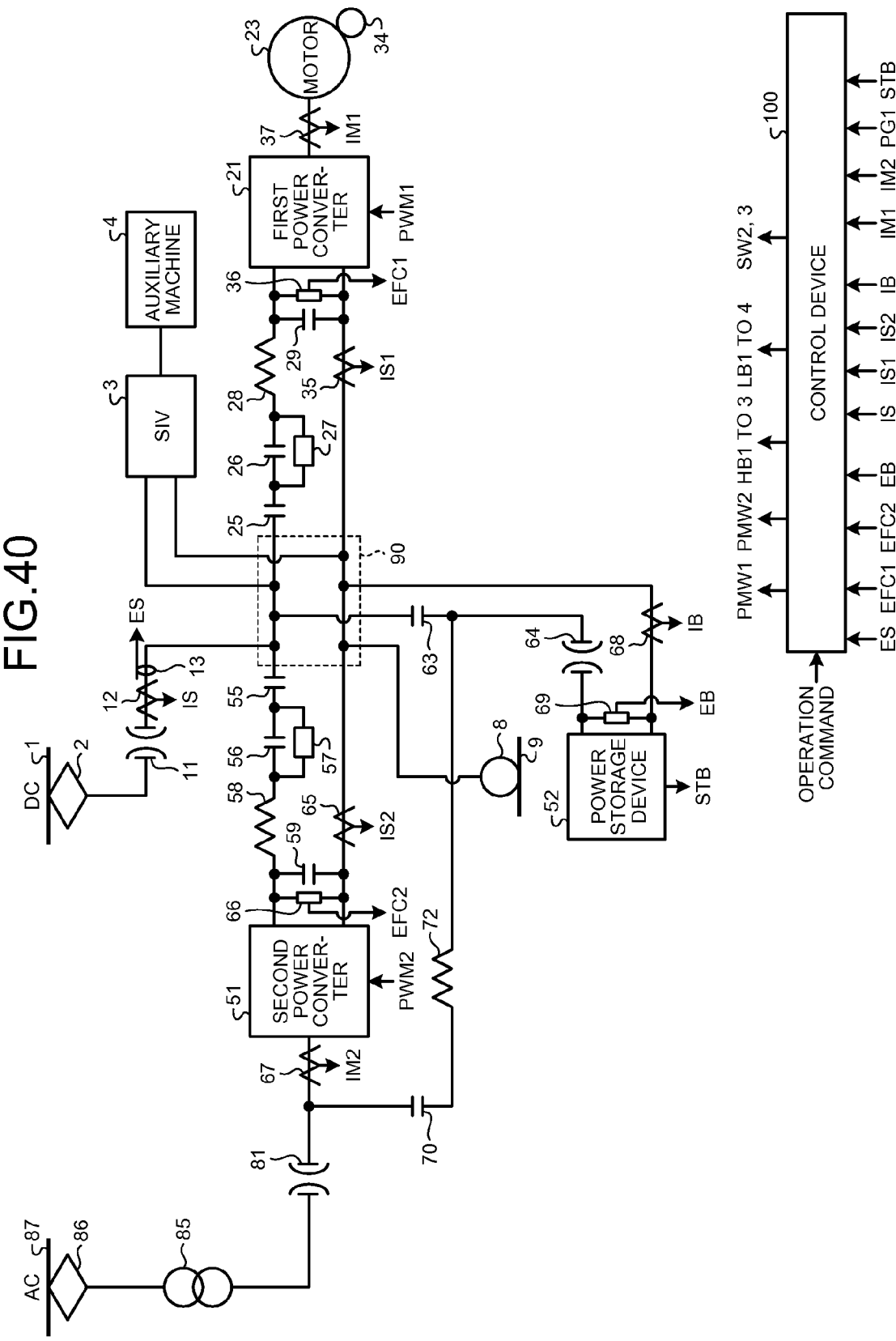
FIG. 40 is a diagram of another configuration example of the hybrid vehicle system including the propulsion control apparatus according to the second embodiment.

Note that, in the example explained in the second embodiment, the AC overhead wire is of a single phase. However, as shown in FIG. 40, power supply can be received from a three-phase AC overhead wire 87 via an AC pantograph 86 and a three-phase transformer 85. Key operations are the same as those in the case of the single-phase alternating-current overhead wire. Effects same as those in the case of the single-phase alternating-current overhead wire are obtained.

INDUSTRIAL APPLICABILITY

As explained above, the present invention is useful as a propulsion control apparatus of an electric motor vehicle that does not cause an increase of power converters even when the conventional hybrid vehicle is enabled to be used even with overhead wire power.

REFERENCE SIGNS LIST

1 Direct-current overhead wire (DC overhead wire)
2 DC pantograph
3 Auxiliary power supply device (SIV)
4 Auxiliary machine
5 Engine
6 Generator
7 Speed detector
8 Wheel
9 Rail
11 First circuit breaker
12 Overhead wire current detector
13 Overhead wire voltage detector
21 Power converter
23 Motor
25 First line breaker
26 Second line breaker
27 First charging resistor
28 First filter reactor
29 First filter capacitor
34 First speed detector
35 First direct current detector
36 First filter capacitor voltage detector
37 First power converter output current detector
51 Second power converter
52 Power storage device
55 Third line breaker
56 Fourth line breaker
57 Second charging resistor
58 Second filter reactor
59 Second filter capacitor
61 Third contactor
63 First contactor
64 Second circuit breaker
65 Second direct current detector
66 Second filter capacitor voltage detector
68 Power storage device current detector
70 Second contactor
72 Reactor
80 Transformer
81, 87 Alternating-current overhead wire (AC overhead wire)
81 Third circuit breaker
82, 86 AC pantographs
85 Three-phase transformer
90 Direct-current common section
100 Control device

The invention claimed is:

1. A propulsion control apparatus of an electric motor vehicle comprising:

a first power converter that is connectable to a direct-current common section, operates as a DC/AC converter when direct-current power is input from the direct-current common section, converts the direct-current power into desired alternating-current power and supplies the desired alternating-current power to a motor that generates a driving force for a vehicle, operates as an AC/DC converter according to necessity when regenerative power of the motor is input from the motor side, and supplies the regenerative power to the direct-current common section;

a second power converter that operates as an AC/DC converter when alternating-current power supplied from an alternating-current power supply source is input from a first input and output end side, converts the alternating-current power into direct-current power and outputs the direct-current power to the direct-current common section via a second input and output end different from the first input and output end, operates as a DC/AC converter and output desired alternating current power to the first input and output end side when direct-current power supplied from the direct-current common section is input from the second input and output end side, operates as a DC/DC converter and outputs desired direct-current power to the second input and output end side when direct-current power is input from the first input and output end side, and operates as the DC/DC converter and outputs desired direct-current power to the first input and output end side when direct-current power is input from the second input and output end side;

a power storage device functioning as a direct-current power supply source that is configured to be connectable to the direct-current common section and the first input and output end side and charged with direct-current power supplied from the direct-current common section or the first input and output end side or discharges direct-current power to the direct-current common section or the first input and output end side; and a control device that controls operations of the first power converter, the second power converter, and the power storage device.

2. The propulsion control apparatus of the electric motor vehicle according to claim 1, wherein the control device causes the second power converter to operate as the AC/DC converter, converts generated power of the generator into direct-current power, and supplies the direct-current power to the first power converter and causes the first power converter to operate as the DC/AC converter and drives the motor using the direct-current powers supplied from the second power converter and the power storage device.

3. The propulsion control apparatus of the electric motor vehicle according to claim 2, wherein the control device controls an output voltage of the second power converter such that the voltage of the direct-current common section becomes a low voltage adjusted to the output voltage of the power storage device.

4. The propulsion control apparatus of the electric motor vehicle according to claim 1, wherein the control device causes the second power converter to operate as the DC/DC converter, converts direct-current power of the power storage device into desired direct-current power, and supplies the predetermined direct-current power to the first power converter and causes the first power converter to operate as the DC/AC converter and drives the motor using the direct-current power supplied from the second power converter.

5. The propulsion control apparatus of the electric motor vehicle according to claim 4, wherein the control device controls an output voltage of the second power converter such that the voltage of the direct-current common section becomes a high voltage adjusted to the output voltage of another direct-current power supply source.

6. The propulsion control apparatus of the electric motor vehicle according to claim 5, wherein the other direct-current power supply source is a direct-current overhead wire.

7. The propulsion control apparatus of the electric motor vehicle according to claim 6, wherein the control device drives the motor further using electric power of the direct-current overhead wire.

8. The propulsion control apparatus of the electric motor vehicle according to claim 6, wherein, when an engine and a generator driven by the engine are provided as the alternating-current power supply source and electric power of the direct-current overhead wire is not supplied to the direct-current common section, the control device supplies, electric power of the power storage device to the direct-current common section, causes the second power converter to operate as the DC/DC converter, drives the generator as a motor to start the engine.

9. The propulsion control apparatus of the electric motor vehicle according to claim 1, wherein the control device causes the first power converter to operate as the AC/DC converter and receives regenerative power of the motor to charge the power storage device and causes the second power converter to operate as the DC/AC converter and drives the generator using excess power supplied from the first power converter to apply an engine brake.

10. The propulsion control apparatus of the electric motor vehicle according to claim 9, wherein the control device controls an output voltage of the first power converter such that the voltage of the direct-current common section becomes a low voltage adjusted to the output voltage of the power storage device.

11. The propulsion control apparatus of the electric motor vehicle according to claim 1, wherein the control device causes the first power converter to operate as the AC/DC converter and converts regenerative power of the motor into direct-current power and causes the second power converter to operate as the DC/DC converter and supplies converted power of the first power converter from the first input and output end side to charge the power storage device.

12. The propulsion control apparatus of the electric motor vehicle according to claim 11, wherein the control device controls an output voltage of the first power converter such that a voltage of the direct-current common section becomes a high voltage adjusted to the output voltage of another direct-current power supply source.

13. The propulsion control apparatus of the electric motor vehicle according to claim 12, wherein said another direct-current power supply source is a direct-current overhead wire.

14. The propulsion control apparatus of the electric motor vehicle according to claim 13, wherein the control device charges the power storage device further using electric power of the direct-current overhead wire.

15. The propulsion control apparatus of the electric motor vehicle according to claim 1, wherein, when an alternating-current overhead wire functioning as the alternating-current power supply source is connected to the first input and output end side of the second power converter via a transformer, the control device causes the first power converter to operate as the AC/DC converter and converts regenerative power of the motor into direct-current power to charge the power storage device and causes the second power converter to operate as the DC/AC converter, converts excess power of the regenerative power supplied from the first power converter into alternating-current power, and supplies the alternating-current power to the alternating-current overhead wire.

16. The propulsion control apparatus of the electric motor vehicle according to claim 15, wherein, when performing charging in the power storage device, the control device causes the second power converter to operate as the AC/DC converter and steps down the voltage of the alternating-current overhead wire to a predetermined low voltage to charge the power storage device and, when performing discharging from the power storage device, the control device steps up the output voltage of the power storage device to a predetermined alternating-current voltage and performs discharging to the alternating-current overhead wire.

17. The propulsion control apparatus of the electric motor vehicle according to claim 15, wherein, when performing power interchange from the direct-current overhead wire to the alternating-current overhead wire, the control device causes the second power converter to operate as the DC/AC converter and, when performing the power interchange from the alternating-current overhead wire to the direct-current overhead wire, the control device causes the second power converter to operate as the AC/DC converter.

18. A control method for a propulsion control apparatus of an electric motor vehicle, the propulsion control apparatus including:
  a first power converter that is connectable to a direct-current common section, operates as a DC/AC converter when direct-current power is input from the direct-current common section, converts the direct-current power into desired alternating-current power and supplies the desired alternating-current power to a motor that generates a driving force for a vehicle, operates as an AC/DC converter according to necessity when regenerative power of the motor is input from the motor side, and supplies the regenerative power to the direct-current common section;
  a second power converter that operates as an AC/DC converter when alternating-current power supplied from an alternating-current power supply source is input from a first input and output end side, converts the alternating-current power into direct-current power and outputs the direct-current power to the direct-current common section via a second input and output end different from the first input and output end, operates as a DC/AC converter and output desired alternating-current power to the first input and output end side when direct-current power supplied from the direct-current common section is input from the second input and output end side, operates as a DC/DC converter and outputs desired direct-current power to the second input and output end side when direct-current power is input from the first input and output end side, and operates as the DC/DC converter and outputs desired direct-current power to the first input and output end side when direct-current power is input from the second input and output end side;
  a power storage device functioning as a direct-current power supply source that is configured to be connectable to the direct-current common section and the first input and output end side and charged with direct-current power supplied from the direct-current common section or the first input and output end side or discharges direct-current power to the direct-current common section or the first input and output end side; and
  a control device that controls operations of the first power converter, the second power converter, and the power storage device,
  the control method comprising setting the voltage of the direct-current common section to different voltages during departure and during power running.

* * * * *